US011990689B2

(12) United States Patent
Oh et al.

(10) Patent No.: US 11,990,689 B2
(45) Date of Patent: May 21, 2024

(54) ANTENNA SYSTEM FOR WEARABLE DEVICES

(71) Applicant: META PLATFORMS TECHNOLOGIES, LLC, Menlo Park, CA (US)

(72) Inventors: Sung Hoon Oh, San Jose, CA (US); Yonghua Wei, San Diego, CA (US); Md Rashidul Islam, Fremont, CA (US); Qian Qiao, San Jose, CA (US); Ulf Jan-Ove Mattsson, Campbell, CA (US); Geng Ye, Union City, CA (US); Bruno Cendon Martin, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 212 days.

(21) Appl. No.: 17/550,963

(22) Filed: Dec. 14, 2021

(65) Prior Publication Data

US 2022/0393352 A1 Dec. 8, 2022

Related U.S. Application Data

(60) Provisional application No. 63/208,142, filed on Jun. 8, 2021.

(51) Int. Cl.
*H01Q 5/35* (2015.01)
*H01Q 1/27* (2006.01)
*H01Q 5/45* (2015.01)

(52) U.S. Cl.
CPC ............... *H01Q 5/35* (2015.01); *H01Q 1/273* (2013.01); *H01Q 5/45* (2015.01)

(58) Field of Classification Search
CPC ............. H01Q 1/273; H01Q 5/35; H01Q 5/45
See application file for complete search history.

(56) References Cited

U.S. PATENT DOCUMENTS 8,982,000 B2 3/2015 Kim et al.
2016/0187857 A1* 6/2016 Cho ......................... H01Q 1/48 368/47

(Continued)

FOREIGN PATENT DOCUMENTS

CN 107645060 A 1/2018

OTHER PUBLICATIONS

International Search Report and Written Opinion for International Application No. PCT/US2022/032659, dated Sep. 20, 2022, 13 pages.

*Primary Examiner* — Hoang V Nguyen
*Assistant Examiner* — Amal Patel
(74) *Attorney, Agent, or Firm* — Greenberg Traurig, LLP

(57) ABSTRACT

The disclosed system may include an enclosure that is configured to house internal electrical components disposed on a printed circuit board (PCB). The system may also include a first antenna feed that is electrically connected to the PCB, to the enclosure, and to a radiating coupling arm configured for wireless communication in a first wireless communication band. The system may further include a second antenna feed that is electrically connected to the PCB and to an antenna configured for wireless communication in a second, different wireless communication band. The system may also include a first grounding leg that forms an electrical ground between the PCB and the enclosure, and a second, switchable grounding leg positioned away from the first grounding leg. This switchable grounding leg may provide a controllable electrical ground between the PCB and the enclosure. Various other methods and apparatuses are also disclosed.

20 Claims, 21 Drawing Sheets

(56) References Cited

U.S. PATENT DOCUMENTS

| | | | | |
|---|---|---|---|---|
| 2018/0026361 | A1* | 1/2018 | Sakong | H01Q 1/48 343/860 |
| 2020/0006842 | A1* | 1/2020 | Zhu | H01Q 1/241 |

* cited by examiner

ANTENNA SYSTEM FOR WEARABLE DEVICES

CROSS REFERENCE TO RELATED APPLICATION

This application claims priority to and the benefit of U.S. Provisional Patent Application No. 63/208,142, filed Jun. 8, 2021, which application is incorporated herein, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
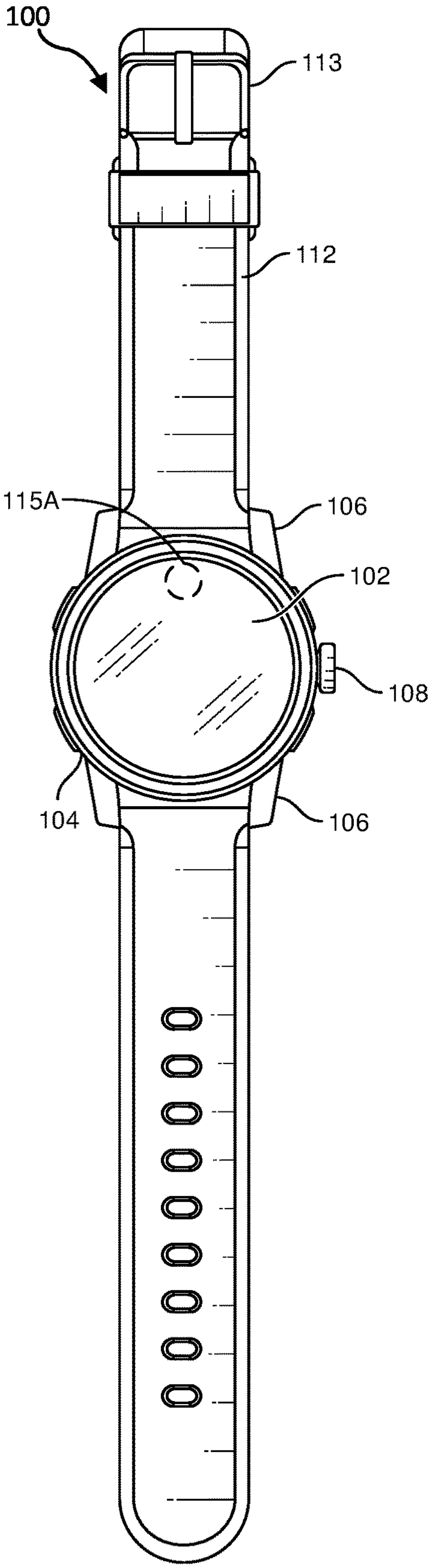
FIG. 1A is a plan view of an example wristband system, according to at least one embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Mobile electronic devices often use many different types of antennas for communication on different frequency bands. For instance, current smartwatches may implement wide- and multi-band long-term evolution (LTE), global positioning system (GPS), wireless fidelity (WiFi), Bluetooth™, near field communication (NFC), or other types of antennas. These different types of antennas may provide long- and short-range communications with other electronic devices and with networks such as cellular networks or the internet.

However, as mobile devices become ever smaller, the amount of space available for these different types of antennas may be limited. Moreover, because of the small size, the amount of bandwidth achievable on any given antenna may be limited. Still further, because mobile devices such as smartwatches are often designed with metal enclosures, placing multiple different types of antennas in different locations where they can receive sufficient operational signal strength may be complicated. In some cases, the size of the mobile device may be increased to accommodate larger antennas. This increased size may, at least in some cases, improve antenna bandwidth and efficiency. However, larger sizes for smartwatches and other mobile devices may be less desirable, as additional weight and bulk in a mobile (especially wearable) device are typically unwanted. Still further, having a metal enclosure may limit how and where different types of antennas may be placed and operated within a mobile device.

The antenna systems disclosed herein may provide improved antenna structure and antenna placements that may utilize the surrounding metal enclosure of a mobile device, as well as a bottom non-metal window, to implement efficient LTE, GPS, WiFi, Bluetooth, NFC, and other antenna systems. At least some of the embodiments herein may use the metal enclosure of a mobile device as a radiating structure. This may be combined with multiple radiating elements implemented on the bottom window which, at least in some cases, may be made using an RF transparent material. Such a combination may provide antenna solutions that achieve high efficiency, while allowing for a compact and slim design without having to increase the size of the mobile device.

As noted above, wearable devices may be configured to be worn on a user's body, such as on a user's wrist or arm. Such wearable devices may be configured to perform a variety of functions. A wristband system, for example, may be an electronic device worn on a user's wrist that performs functions such as delivering content to the user, executing social media applications, executing artificial-reality applications, messaging, web browsing, sensing ambient conditions, interfacing with head-mounted displays, monitoring the health status associated with the user, etc. In some examples, a wristband system may include a watch band that detachably couples to a watch body. The watch body may include a coupling mechanism for electrically and mechanically coupling the watch body (e.g., the enclosure or capsule) to the watch band (e.g., the cradle). At least in some cases, the wristband system may have a split architecture that allows the watch band and the watch body to operate both independently and in communication with one another. The mechanical architecture may include a coupling mechanism on the watch band and/or the watch body that allows a user to conveniently attach and detach the watch body from the watch band.

Figure 1B:
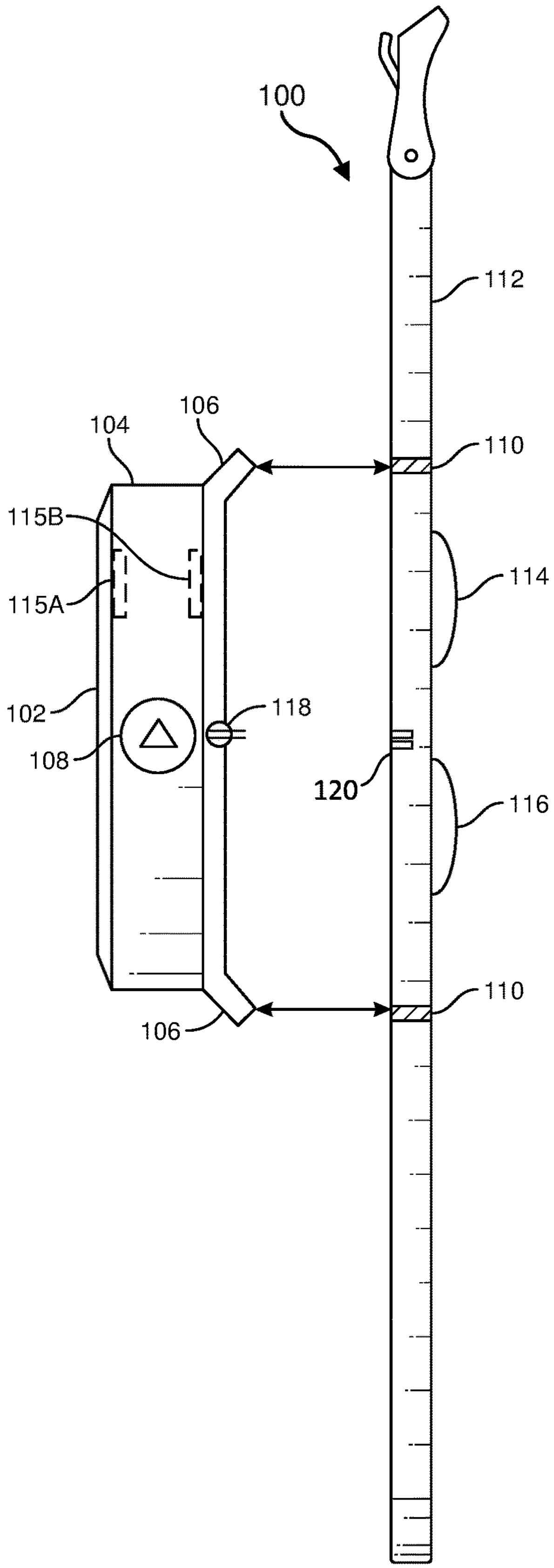
FIG. 1B is a side view of the example wristband system of FIG. 1A, according to at least one embodiment of the present disclosure.

The wristband system of FIGS. 1A and 1B, for example, may be used in isolation or in conjunction with other systems including artificial-reality (AR) systems. Sensors of the wristband system (e.g., image sensors, inertial measurement units (IMUS), etc.) may be used, for example, to enhance an AR application running on the AR system. Further, the watch band may include sensors that measure biometrics of the user. For example, the watch band may include neuromuscular sensors (e.g., neuromuscular sensors 1810 of FIG. 18A) disposed on an inside surface of the watch band contacting the user that detects the muscle intentions of the user. The AR system may include a head-mounted display that is configured to enhance a user interaction with an object within the AR environment based on the muscle intentions of the user. Signals sensed by the neuromuscular sensors may be processed and used to provide a user with an enhanced interaction with a physical object and/or a virtual object in an AR environment. For example, the AR system may operate in conjunction with the neuromuscular sensors to overlay one or more visual indicators on or near an object within the AR environment such that the user could perform "enhanced" or "augmented" interactions with the object.

Figure 2A:
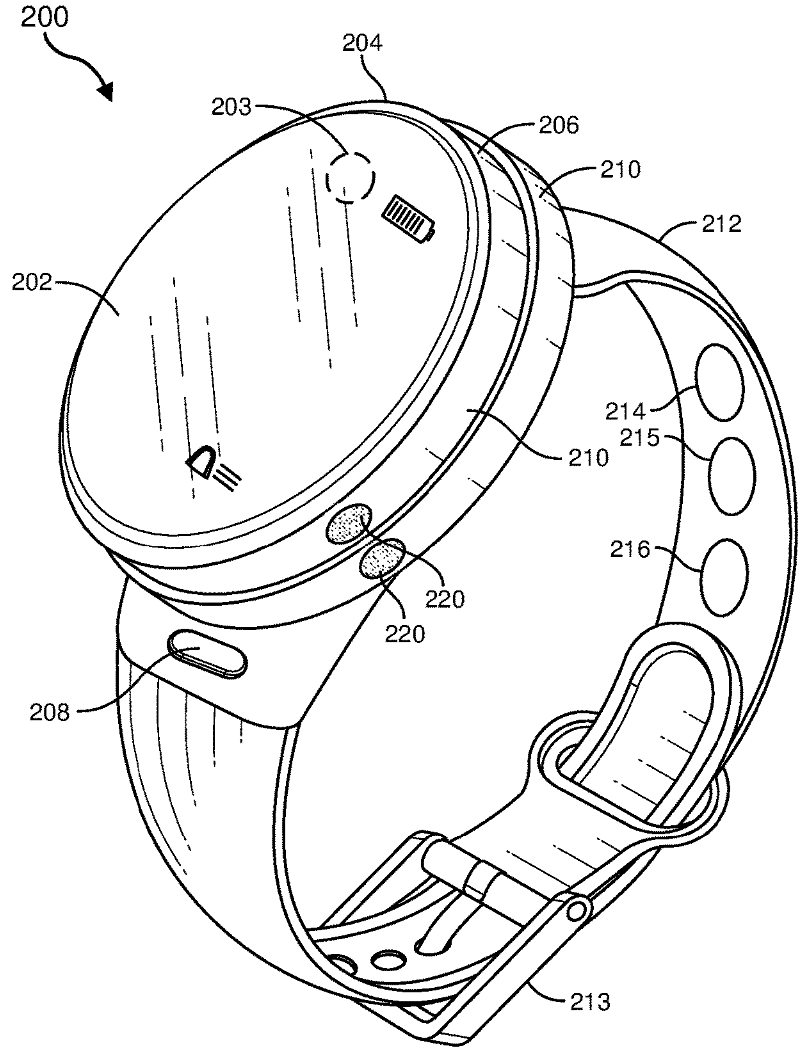
FIG. 2A is a perspective view of an example wristband system, according to at least one embodiment of the present disclosure.
Figure 2B:
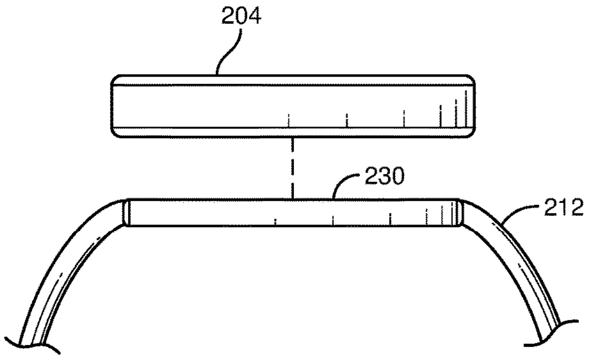
FIG. 2B is a side view of another example wristband system, according to at least one embodiment of the present disclosure.
Figure 2C:
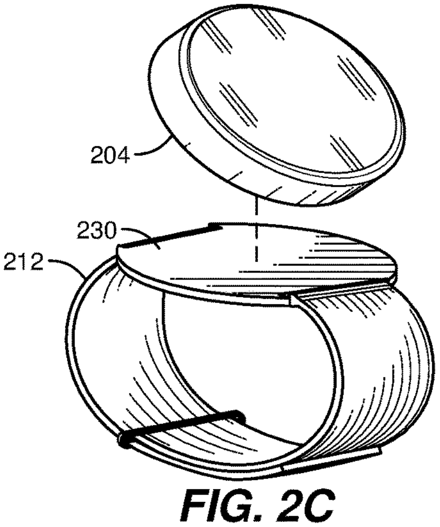
FIG. 2C is a perspective view of another example wristband system, according to at least one embodiment of the present disclosure.

FIGS. 1A and 1B illustrate an embodiment of a wristband system including a watch band and a watch body. In some cases, neuromuscular sensors may be integrated within the wristband system, as shown in FIGS. 2A, 2B, and 2C. FIG. 1A illustrates an example wristband system 100 that includes a watch body 104 coupled to a watch band 112. Watch body 104 and watch band 112 may have any size and/or shape that is configured to allow a user to wear wristband system 100 on a body part (e.g., a wrist). Wristband system 100 may include a retaining mechanism 113 (e.g., a buckle) for securing watch band 112 to the user's wrist. Wristband system 100 may also include a coupling mechanism 106, 110 for detachably coupling watch body 104 to watch band 112. Still further, the wristband system 100 may include a button or wheel 108 that allows users to interact with the wristband system 100 including applications that run on the system.

Wristband system 100 may perform various functions associated with the user. The functions may be executed independently in watch body 104, independently in watch band 112, and/or in communication between watch body 104 and watch band 112. Watch band 112 and its associated antennas may be configured to operate independently (e.g., execute functions independently) from watch body 104. Additionally or alternatively, watch body 104 and its associated antennas may be configured to operate independently (e.g., execute functions independently) from watch band 112. At least in some cases, watch band 112 and/or watch body 104 may each include the independent resources required to independently execute functions. For example, watch band 112 and/or watch body 104 may each include a power source (e.g., a battery), a memory, data storage, a processor (e.g., a CPU), communications (including multiple different types of antennas), a light source (e.g., at least one infrared LED for tracking watch body 104 and/or watch band 112 in space with an external sensor), and/or input/output devices.

FIG. 1B illustrates an example wristband system 100 that includes a watch body 104 decoupled from a watch band 112. Watch band 112 may be donned (e.g., worn) on a body part (e.g., a wrist) of a user and may operate independently from watch body 104. For example, watch band 112 may be configured to be worn by a user and an inner surface of watch band 112 may be in contact with the user's skin. When worn by a user, sensor 114 may be in contact with the user's skin. Sensor 114 may be a biosensor that senses a user's heart rate, bioimpedance, saturated oxygen level, temperature, sweat level, muscle intentions, steps taken, or a combination thereof. Watch band 112 may include multiple sensors 114 and 116 that may be distributed on an inside surface, in an interior volume, and/or on an outside surface of watch band 112. In some examples, watch body 104 may include an electrical connector 118 that mates with connector 120 of watch band 112 for wired communication and/or power transfer. In some examples, as will be described further below, watch body 104 and/or watch band 112 may include wireless communication devices including LTE antennas, GPS antennas, Bluetooth antennas, WiFi antennas, NFC antennas, or other types of antennas.

Wristband system 100 may include a coupling mechanism for detachably coupling watch body 104 to watch band 112. A user may detach watch body 104 from watch band 112 in order to reduce the encumbrance of wristband system 100 to the user. Detaching watch body 104 from watch band 112 may reduce a physical profile and/or a weight of wristband system 100. Wristband system 100 may include a watch body coupling mechanism(s) 106 and/or a watch band coupling mechanism(s) 110. A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

As illustrated in FIG. 1B, in some examples, watch body 104 may include front-facing image sensor 115A and rear-facing image sensor 115B. Front-facing image sensor 115A may be located in a front face of watch body 104 (e.g., substantially near, under, or on the display 102), and rear-facing image sensor 115B may be located in a rear face of watch body 104. In some examples, a level of functionality of at least one of watch band 112 or watch body 104 may be modified when watch body 104 is detached from watch band 112. The level of functionality that may be modified may include the functionality of front-facing image sensor 115A and/or rear-facing image sensor 115B. Alternatively, the level of functionality may be modified to change how the various antennas within the system. For instance, as will be described further below, the embodiments herein may include a cosmetic RF transparent feature that may form a functional link between wrist strap antennas and internal electronic components including tuners, amplifiers, controllers, and data processors.

FIG. 2A illustrates a perspective view of an example wristband system 200 that includes a watch body 204 decoupled from a watch band 212. Wristband system 200 may be structured and/or function similarly to wristband system 100 of FIGS. 1A and 1B. Watch body 204 and watch band 212 may have a substantially rectangular or circular shape and may be configured to allow a user to wear wristband system 200 on a body part (e.g., a wrist). Wristband system 200 may include a retaining mechanism 213 (e.g., a buckle, a hook and loop fastener, etc.) for securing watch band 212 to the user's wrist. Wristband system 200 may also include a coupling mechanism 208 for detachably coupling watch body 204 to watch band 212. The watch body 204 may include an enclosure 206 that houses various electronic components. In some cases, the watch body 204 may be referred to as a "capsule."

Wristband system 200 may perform various functions associated with the user as described above with reference to FIGS. 1A and 1B. The functions executed by wristband system 200 may include, without limitation, display of visual content to the user (e.g., visual content displayed on display screen 202), sensing user input (e.g., sensing a touch on a touch bezel 210 or on a physical button, sensing biometric data on sensor 214, sensing neuromuscular signals on neuromuscular sensors 215 or 216, sensing audio input via microphones 220, etc.), messaging (e.g., text, speech, video, etc.), image capture (e.g., with a front-facing image sensor 203 and/or a rear-facing image sensor), wireless communications (e.g., cellular, near field, WiFi, personal area network, etc.), location determination, financial transactions, providing haptic feedback, alarms, notifications, biometric authentication, health monitoring, sleep monitoring, etc. These functions may be executed independently in watch body 204, independently in watch band 212, and/or in communication between watch body 204 and watch band 212. Functions may be executed on wristband system 200 in conjunction with an artificial-reality system such as the artificial-reality systems described in FIGS. 13-18B. In some examples, wristband system 200 may include vibrotactile system 1700 of FIG. 17.

Watch band 212 may be configured to be worn by a user such that an inner surface of watch band 212 may be in contact with the user's skin. When worn by a user, sensor 214 may be in contact with the user's skin. Sensor 214 may be a biosensor that senses a user's heart rate, saturated oxygen level, temperature, sweat level, muscle intentions, or a combination thereof. Watch band 212 may include multiple sensors 214 that may be distributed on an inside and/or an outside surface of watch band 212. Additionally or alternatively, watch body 204 may include the same or different sensors than watch band 212. For example, multiple sensors may be distributed on an inside and/or an outside surface of watch body 204 or on the surface of the wrist straps. The watch body 204 may include, without limitation, front-facing image sensor 115A, rear-facing image sensor 115B, a biometric sensor, an IMU, a heart rate sensor, a saturated oxygen sensor, a neuromuscular sensor(s) (e.g., neuromuscular sensors 1810 of FIG. 18A), an altimeter sensor, a temperature sensor, a bioimpedance sensor, a pedometer sensor, an optical sensor, a touch sensor, a sweat sensor, etc.

Watch band 212 may transmit the data acquired by sensor 214 to watch body 204 using a wired communication method (e.g., a UART, a USB transceiver, etc.) and/or a wireless communication method (e.g., near field communication, Bluetooth™, etc.). Watch band 212 may be configured to operate (e.g., to collect data using sensor 214) independent of whether watch body 204 is coupled to or decoupled from watch band 212. In some examples, watch band 212 may include a neuromuscular sensor 215 (e.g., an electromyography (EMG) sensor, a mechanomyogram (MMG) sensor, a sonomyography (SMG) sensor, etc.). Neuromuscular sensor 215 may sense a user's muscle intention. Neuromuscular sensor 215 may include neuromuscular sensor 1810 of FIG. 18A.

FIG. 2B is a side view and FIG. 2C is a perspective view of another example wristband system. The wristband systems of FIGS. 2B and 2C may include a watch body interface 230 or "cradle." Watch body 204 may be detachably coupled to watch body interface 230. In additional examples, one or more electronic components may be housed in watch body interface 230 and one or more other electronic components may be housed in portions of watch band 212 away from watch body interface 230.

FIGS. 3A-3D illustrate embodiments of a wristband system 300 that includes an enclosure 301. In at least some embodiments, this enclosure 301 may be formed of metal or other conducting material, and may be designed to radiate, thereby functioning as (at least part of) an antenna. The enclosure may be manufactured or produced in substantially any shape or size, including the square shape shown in FIG. 3A. The enclosure 301 may be configured to house one or more internal electrical components including antenna feeds 305, 307, 308, grounding legs 302 and 303, and other components. These electrical components may be disposed on one or more printed circuit boards (PCBs). The PCB 304 may be a single-layer or a multi-layer board. Moreover, at least in some cases, the enclosure 301 may include multiple PCBs that may be linked together or may run independently of each other.

Figure 3A:
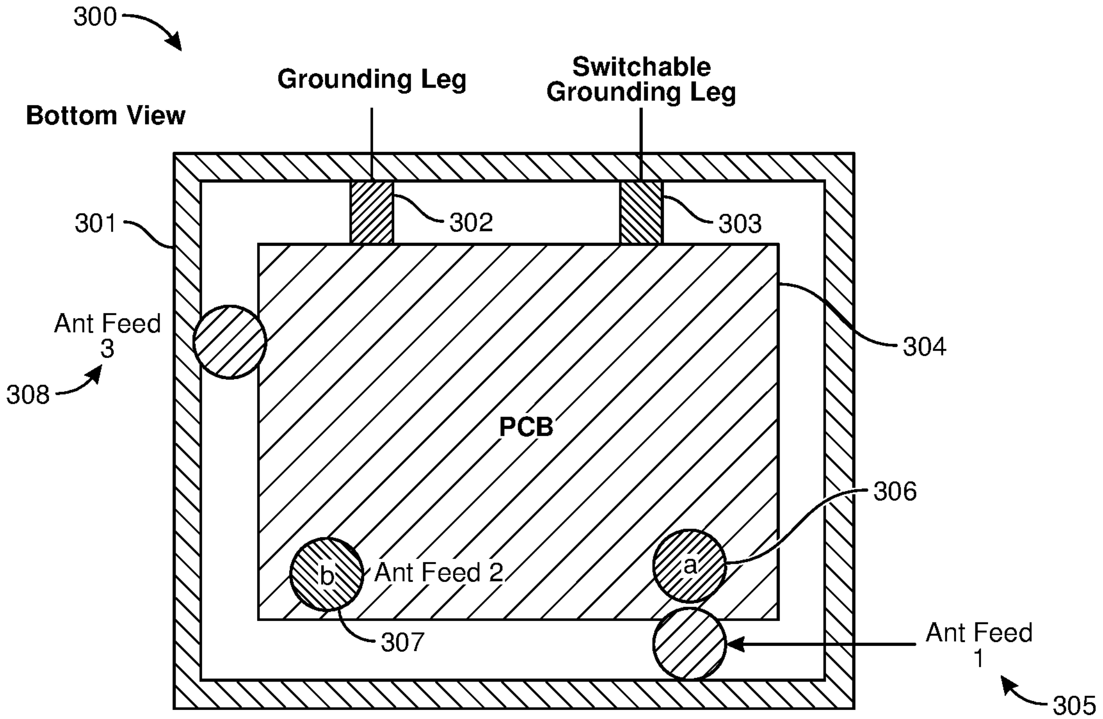
FIG. 3A illustrates a bottom view of an example wristband system, according to at least one embodiment of the present disclosure.
Figure 3B:
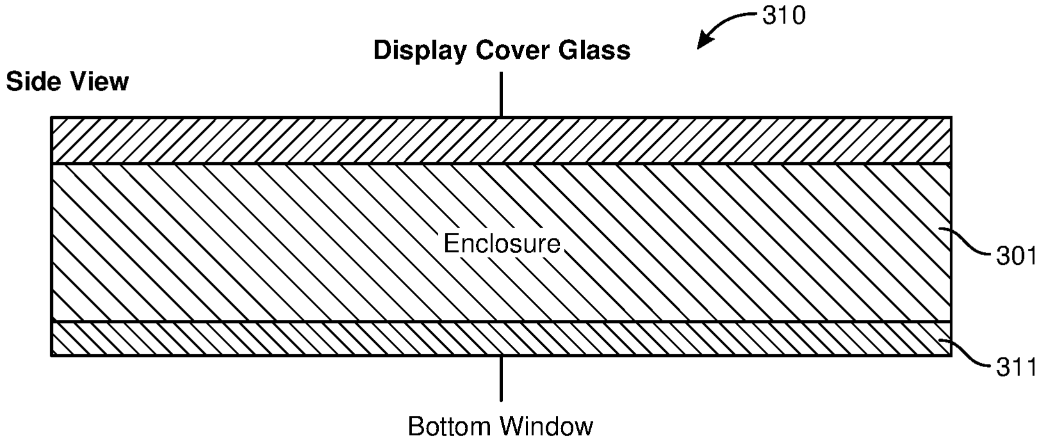
FIG. 3B illustrates a side view of an example wristband system, according to at least one embodiment of the present disclosure.

The bottom view of FIG. 3A illustrates multiple different antenna feeds (e.g., 305, 307, and 308). It will be understood that the enclosure 301 may house substantially any number of antenna feeds, and that the antenna feeds may facilitate antenna reception or transmission via multiple different wireless communication technologies including LTE (or other cellular technologies), WiFi, Bluetooth, GPS, NFC, or other antenna technologies. As the term is used herein, an "antenna feed" may refer to any electronic circuitry that lies between an antenna and a receiver or transmitter, including transmission lines, impedance matching circuits, tuners, amplifiers, or other electronic components.

At least in some embodiments, the antenna feed 1 (305) may be an LTE antenna feed. Antenna feed 1 may, at least in some cases, electrically connect to a radiating element (e.g., a coupling arm 306) that operates on lower or mid-range frequency bands. In some embodiments, the antenna feed 2 (307) may be a GPS antenna feed. The GPS antenna feed may receive and transmit GPS signals to a GPS satellite. The positioning of the GPS antenna feed 307 between antenna feed 1 and antenna feed 3 (308) may provide various benefits, as will be explained further below. In some embodiments, antenna feed 3 (308) may be a WiFi antenna feed, a Bluetooth antenna feed, or some other type of antenna feed.

Antenna feed 1 (305) may be electrically connected to the PCB 304 and to the enclosure 301, and may further be electrically connected to a radiating coupling arm 306 configured for wireless communication in a specified wireless communication band (e.g., LTE). The antenna feed 2 may be electrically connected to the PCB, and may further be electrically connected to an antenna configured for wireless communication in a second, different wireless communication band (e.g., GPS). These antenna feeds may be electrically connected to a grounding leg 302. This grounding leg 302 may form an electrical ground between the PCB 304 and the enclosure 301. The enclosure 301 may also include a second, switchable grounding leg 303 that provides a controllable electrical ground between the PCB 304 and the enclosure 301. The switchable grounding leg 303 may provide for different operational characteristics of the wristband system.

For instance, having the switchable grounding leg 303 switched ON will form two grounding legs in this embodiment: 302 and 303. Because the enclosure 301 may be conductive and may act as a radiator for communication in a wireless communication band, the grounding and the position of the grounding may alter the radiating characteristics of the enclosure. Indeed, at least for this reason, the second, switchable grounding leg 303 may be positioned a minimum specified distance away from the first grounding leg 302. Having this minimum distance ensures that the two grounding legs function as two different grounding positions, and not a single grounding spot. Having two different grounding spots may be advantageous, especially in embodiments where the enclosure 301 is coupled to or uncoupled from a cradle (e.g., 230 in FIG. 2B) or other potentially conductive device. This will be described further below with regard to FIGS. 6-7B.

Returning to FIG. 3B, this figure illustrates a side view of the enclosure 301. As can be seen, the enclosure 301 may include a portion of display cover glass 310 or other material that functions to protect a display on the top side of the enclosure. The display and/or the associated cover material may be made of non-conducting materials. Similarly, the bottom window 311 may be made of glass, plastic, or other non-conductive material. These top and bottom surfaces may thus be free from substances that could attenuate, or distort incoming or outgoing antenna signals.

Figure 3C:
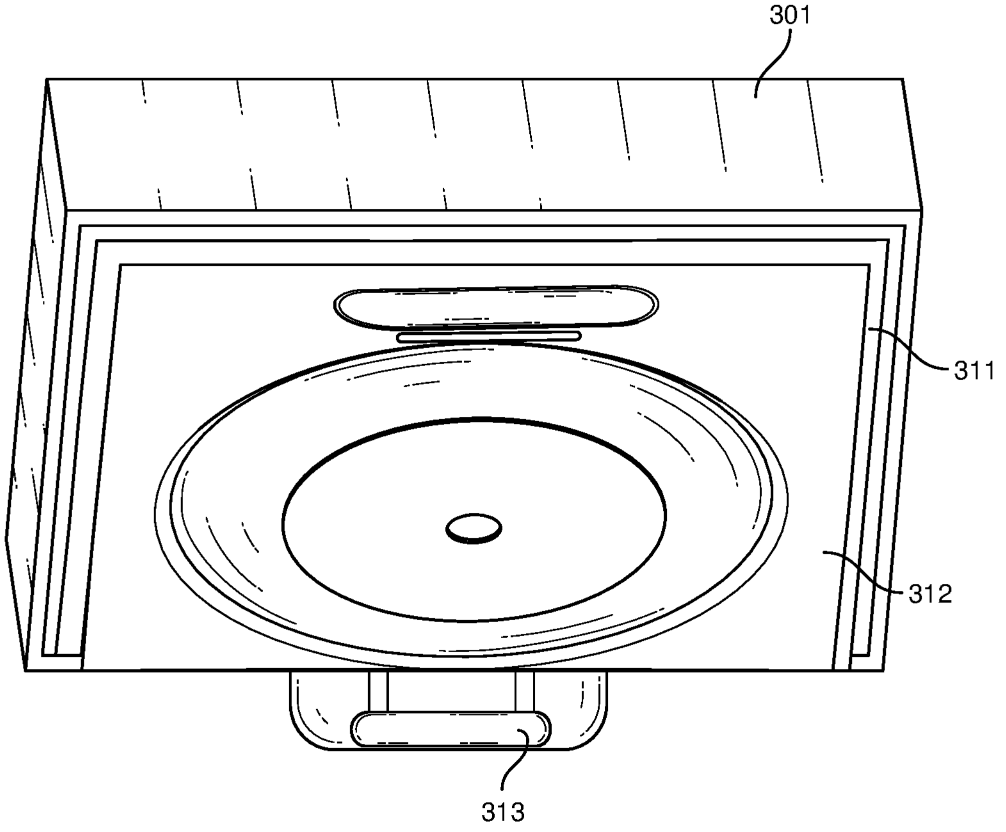
FIG. 3C illustrates a bottom perspective view of an example wristband system, according to at least one embodiment of the present disclosure.
Figure 3D:
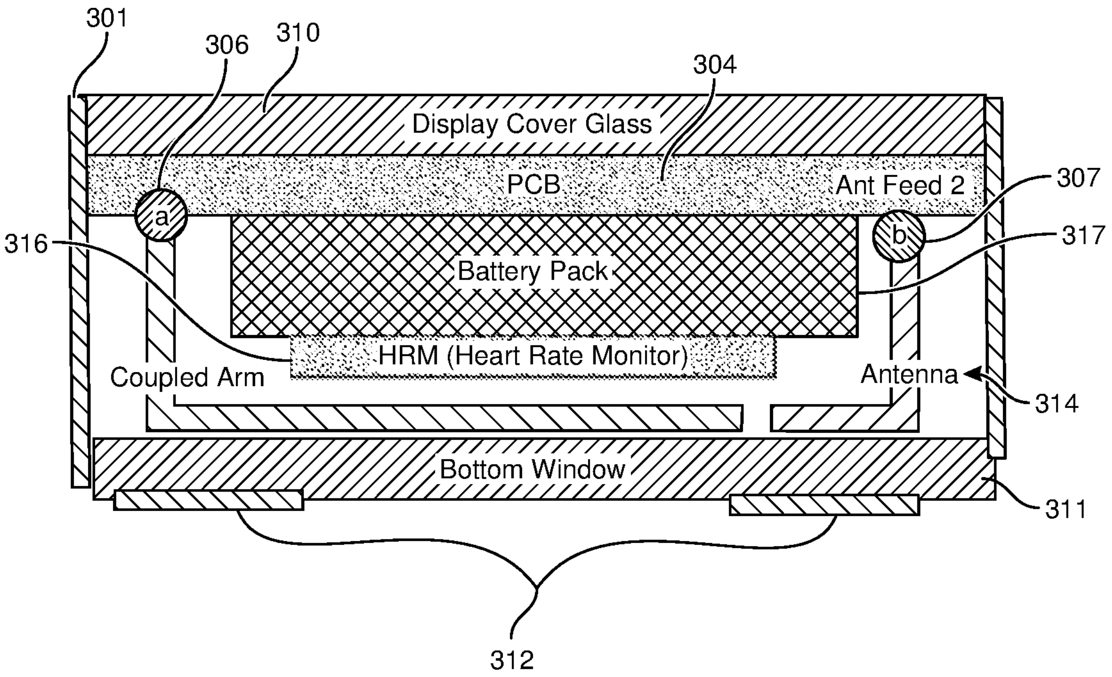
FIG. 3D illustrates a detailed side view of an example wristband system, according to at least one embodiment of the present disclosure.

FIGS. 3C and 3D illustrate embodiments in which the enclosure 301 is coupled to a cradle 312. The cradle may be configured to conform to a user's wrist. The cradle 312 may include wrist strap attachment points 313 at which left and right wrist straps may attach. As such, a user may wear the cradle 312 using wrist straps (e.g., 112 of FIG. 1A), and may couple the enclosure 301 to the cradle or, when desired, uncouple the enclosure from the cradle. In some cases, the cradle 312 may include its own PCB (single-layer or multiple-layer) and its own internal electronics including processors, controllers, memory, data storage, antennas, receivers, transmitters, amplifiers, tuners, or other electronic components. In some cases, the cradle 312 may be made from conductive material (e.g., metal) or, in other cases, the cradle may be made either fully or partially out of non-conductive material (e.g., plastic, glass, etc.).

FIG. 3D provides an enlarged side view of an enclosure 301 that is coupled to a cradle 312. The enclosure 301 includes display cover glass 310, a PCB 304, a battery pack 317, a heart rate monitor 316, and potentially other sensors that may read data through the bottom window 311. The enclosure 301 may also include a coupled arm 306 that stretches across portions of the bottom window. The coupled arm 306 may include conductive material that is configured to radiate. In some cases, the coupled arm 306 is coupled to and/or is part of an LTE antenna feed. The LTE antenna (e.g., 305) may be configured to capture high-band electromagnetic waves, while the coupled arm 306 may be configured to capture low- or mid-band waves. Still further, the enclosure 301 may include antenna feed 2 (307), which may connect to antenna 314. In some cases, this may be a GPS antenna and, in other cases, may be another type of antenna. Other antenna feeds (e.g., antenna feed 3 (308)) may also be included, but are not shown in FIG. 3D.

Figure 4:
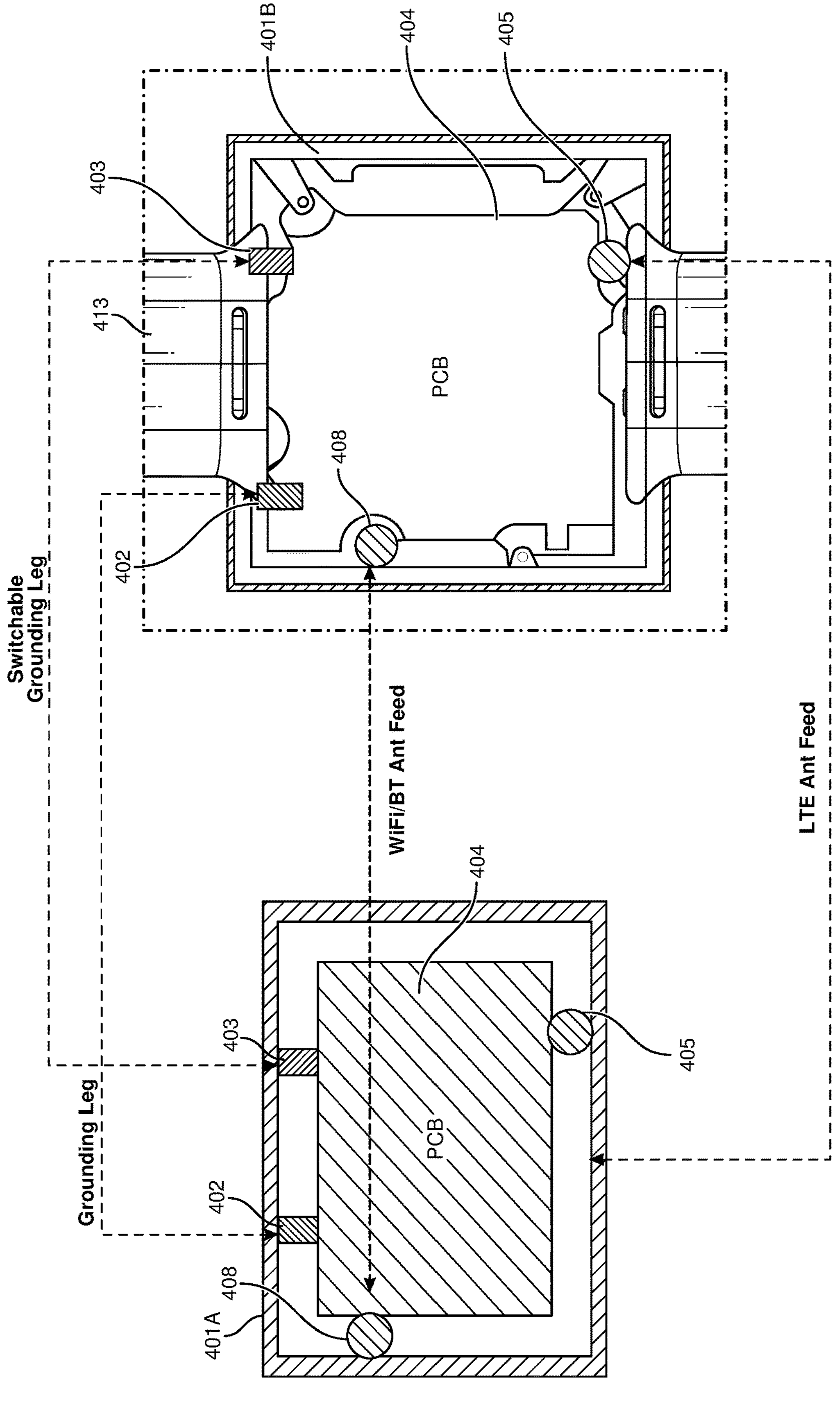
FIG. 4 illustrates a diagram of an example wristband system and a corresponding example wristband system.

FIG. 4 illustrates an embodiment of the same enclosure 401A/401B at differing levels of detail on the right- and left-hand sides. On the left-hand side of FIG. 4, an enclosure 401A is presented that may be the same as or different than the enclosure 301 of FIG. 3. The enclosure 401A may include an antenna feed 405 (e.g., LTE) and a second antenna feed 408 (e.g., WiFi or Bluetooth). The antenna feeds may be electrically connected to the enclosure 401A as illustrated. The PCB 404 may connect to the enclosure 401A via a first grounding leg 402 and/or via a second, switchable grounding leg 403. The grounding legs 402 and 403 may be positioned far enough apart to act as separate grounding legs. In cases where the grounding legs are positioned too close to one another, the two grounding legs may act as a single grounding leg and, as such, would not alter the effective radiating length of the enclosure, as is desired with two different grounding legs. Thus, in the embodiments herein, the distance between grounding legs 402 and 403 may be sufficient to cause each grounding leg to act as a separate electrical ground for the electronic components of the PCB 404. The enclosure 401B may be attached to wrist straps 413 and may potentially be coupled to a cradle (not shown).

As noted above, the enclosure 401 of the wristband system may be produced using a conductive material. That conductive material of the enclosure may act as a radiator for communication in various wireless communication bands including LTE, WiFi, Bluetooth, or other wireless communication bands. That radiator may act differently when the enclosure is coupled to a cradle or to another electronic device. The cradle may include conductive material of its own, and may include a PCB and various electronic components. This conductive material of the cradle and/or the electronic components may alter, interfere with, attenuate, or otherwise affect the radiating enclosure 401, especially once the enclosure is near to or is coupled with the cradle. Accordingly, a switchable grounding leg may be implemented to alter how the radiating enclosure functions when coupled to or uncoupled from a cradle.

Figure 5A:
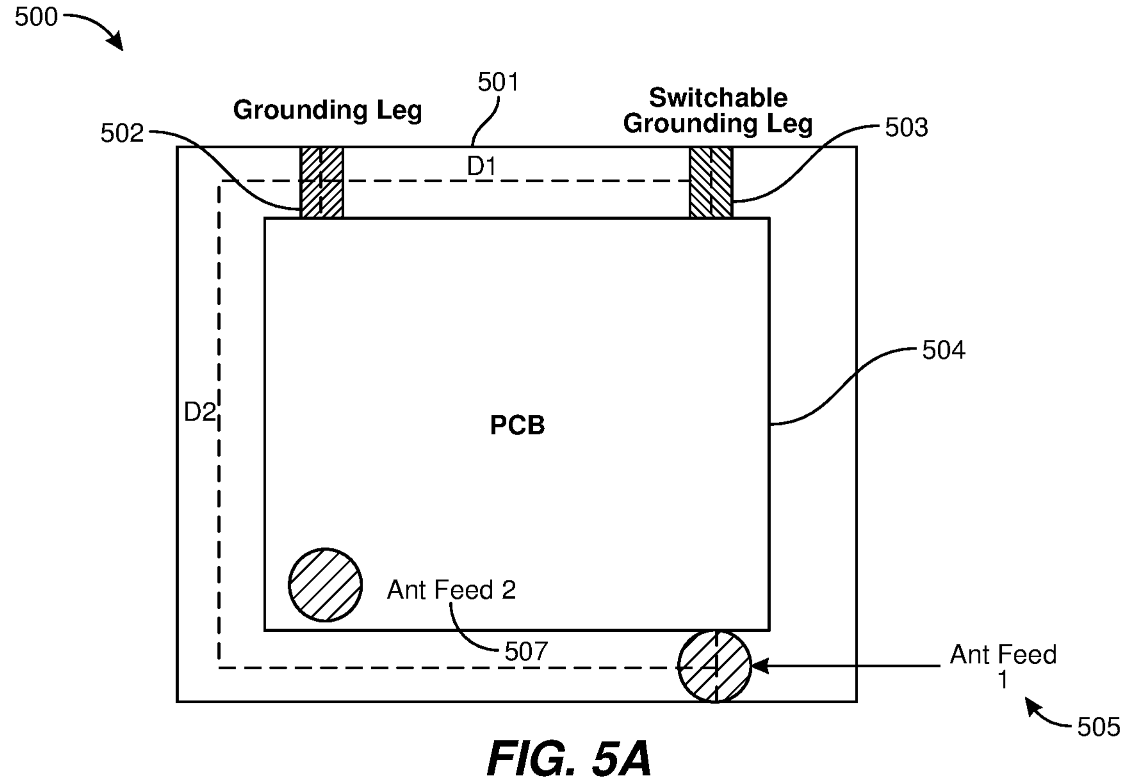
FIGS. 5A & 5B illustrate example embodiments of a wristband system in which antennas are spaced using a relative spacing.
Figure 5B:
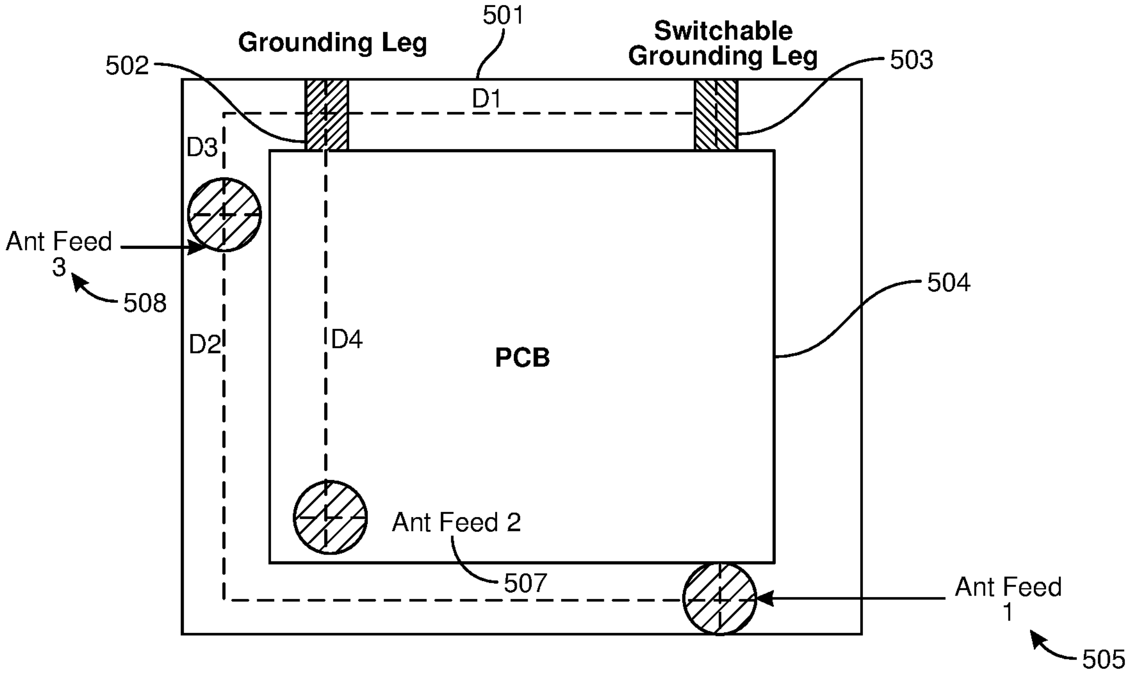

As such, FIGS. 5A and 5B will now be discussed in conjunction with FIGS. 6-8B. FIGS. 5A and 5B illustrate an embodiment of a wristband system 500 that includes an enclosure 501, along with various antenna feeds. For instance, enclosure 501 may include antenna feed 1 (505), which may be a cellular antenna (e.g., LTE) or some other type of antenna. The antenna feed 1 (505) may be grounded to the enclosure 501 which, itself, may be made of a conductive (e.g., metallic) material. The enclosure 501 may also include an antenna feed 2 (507). This antenna feed may be positioned between antenna feed 1 (505) and grounding leg 502. This positioning may reduce interference with signals that flow through antenna feed 1 (505). The antenna feed 2 (507) may be a GPS antenna or other type of antenna.

Because the enclosure 501 is a radiating member of the wristband system 500, the distance between the antenna feed 1 (505) and the grounding leg 502 may be established using certain parameters or factors. This distance (D2) may be sufficiently long to allow placement of other antennas, including antenna feed 2 (507) and, at least in some cases, antenna feed 3 (508) shown in FIG. 5B. Similarly, the distance between antenna feed 3 (508) and grounding leg 502 (distance D3) may also be far enough to avoid interference with grounding leg 502, but also far enough from antenna feeds 1 or 2 to avoid interference with signals running through those feeds. The switchable grounding leg 503 may be positioned a minimum distance (e.g., distance D1) away from grounding leg 502. This minimum distance prevents the two grounding legs from acting as a single ground between the PCB 504 and the conductive enclosure 501.

Because the antenna feeds may be arranged in many different ways (e.g., in different form factors), these distances D1, D2, and D3 may be relative distances, and may be different lengths in different embodiments of the wristband system 500. For instance, in cases where only a single antenna is used, or in cases where only two antennas are used, the distance D2 between antenna feed 1 (505), for example, and grounding leg 502 may be closer together than in cases where three antennas are used (e.g., in FIG. 5B). In such cases, a minimum distance D3 may be provided between grounding leg 502 and antenna feed 3 (508), and then additionally between antenna feeds 1, 2, and/or 3. The distances may also take into consideration the frequencies at which the various antenna feeds are operating, the electronic components provided on the PCB, the material used to construct the enclosure 501, or other factors.

Figure 6:
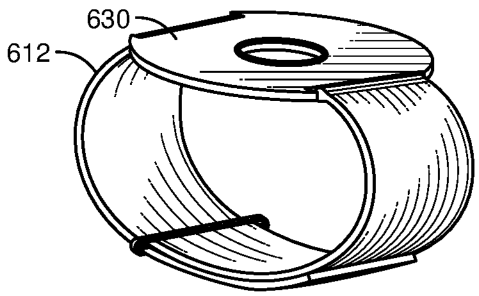
FIG. 6 illustrates an embodiment of an example wristband cradle.

In some cases, the switchable grounding leg 503 may be implemented when the enclosure is used in conjunction with a cradle (e.g., body interface 230). As shown in FIG. 6, for example, a cradle 630 may be provided, which may be the same as or different than cradle 230 of FIG. 2. The cradle 630 may be attached to a watch band 612, which may be the same as or different than the watch band 212 of FIG. 2. The cradle, as described above, may be configured to operate in isolation, or in combination with an enclosure. In cases where the cradle 630 is used in conjunction with an enclosure (e.g., 704 of FIG. 7A), the characteristics of the cradle (e.g., grounding, impedance, interference, etc.) may alter the operating characteristics of the enclosure, including how the enclosure radiates. Accordingly, the switchable grounding leg 503 of FIG. 5A may be implemented to assist in the operation of the enclosure 704 when coupled to or uncoupled from a cradle (e.g., 730 of FIG. 7B).

Figure 7A:
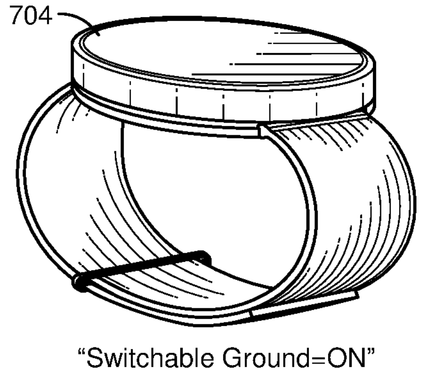
FIGS. 7A & 7B illustrate embodiments in which an enclosure is coupled to and uncoupled from a wristband cradle, respectively.
Figure 7B:
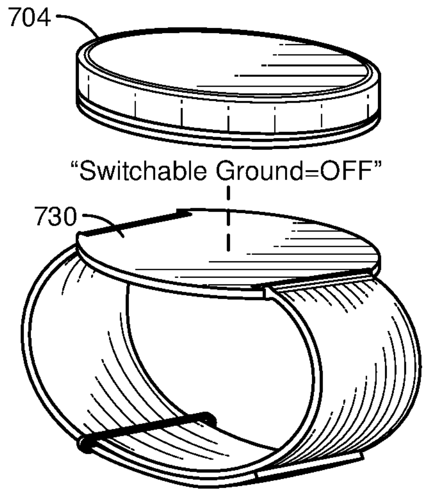

In some embodiments, the switchable grounding leg 503 may be switched ON when the enclosure 704 is coupled to the cradle, as shown in FIG. 7A. And, in some embodiments, the switchable grounding leg 503 may be switched OFF when the enclosure 704 is uncoupled from the cradle 730. As noted above, when the switchable grounding leg 503 is switched ON, the enclosure 501 effectively has two different grounding legs and, when the switchable grounding leg 503 is switched OFF, the enclosure effectively has a single grounding leg. Having one grounding leg or two grounding legs may change the effective elliptical radiating length of the enclosure 704. Thus, in cases where a controller sends a signal to the switchable grounding leg to switch on or off, the switching of the switchable grounding leg 503 from OFF to ON may alter the radiating length of the enclosure 704.

In addition to the enclosure 704, the cradle 730 may also be formed using conductive material. In cases where the enclosure 704 is coupled to the cradle 730, the switchable grounding leg 503 may be switched ON to provide an additional ground between the PCB (and its electronic components) and the enclosure 704. Similarly, when the enclosure 704 is uncoupled from the cradle 730, the switchable grounding leg 503 may be switched to OFF, and only a single grounding leg may be used to ground the electronic components of the PCB. In some cases, a controller or processor within the enclosure 704 and/or within the cradle 730 may receive sensor inputs from one or more sensors (e.g., a hall effect sensor) indicating that the enclosure has coupled to or is in the process of coupling to the cradle 730. That controller or processor may then send a control signal to the switchable grounding leg 503 to switch ON. Upon receiving sensor data indicating that the enclosure 704 is no longer coupled to the cradle 730, the controller or processor may send a control signal to the switchable grounding leg 503 to switch OFF to implement a single grounding leg.

Figure 8B:
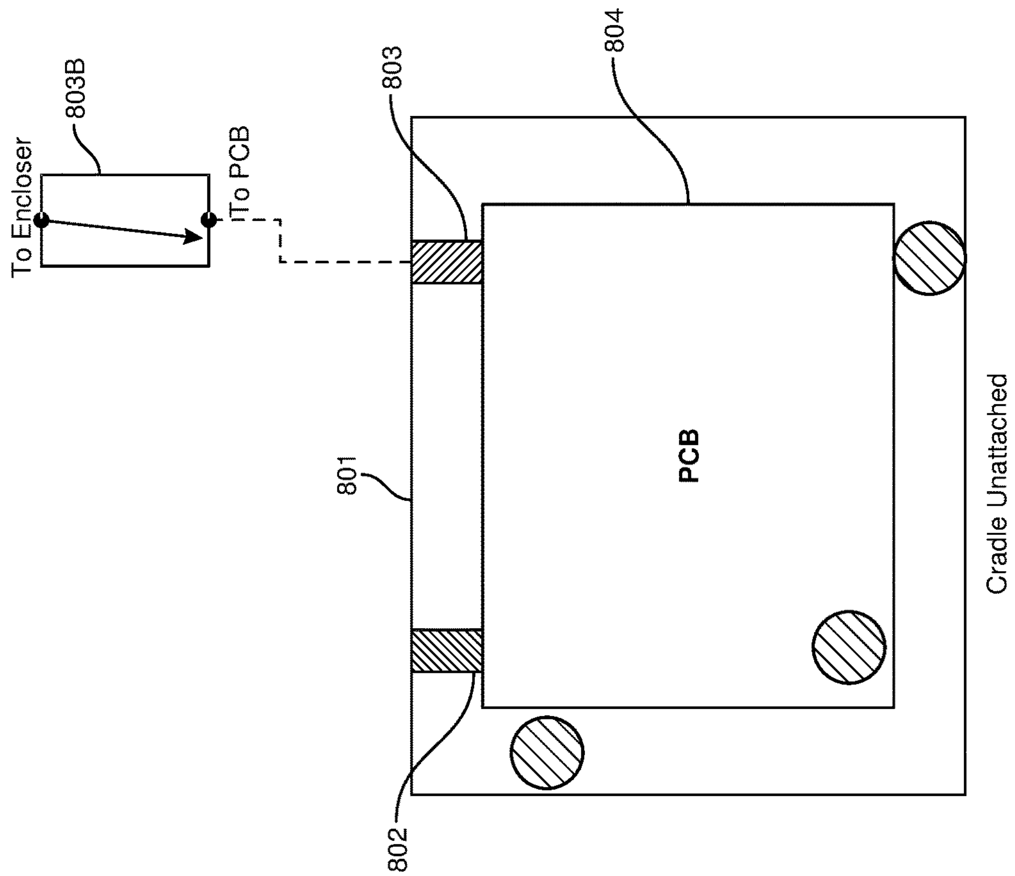
FIGS. 8A & 8B illustrate embodiments in which a switchable ground is switched on and off, respectively.
Figure 8A:
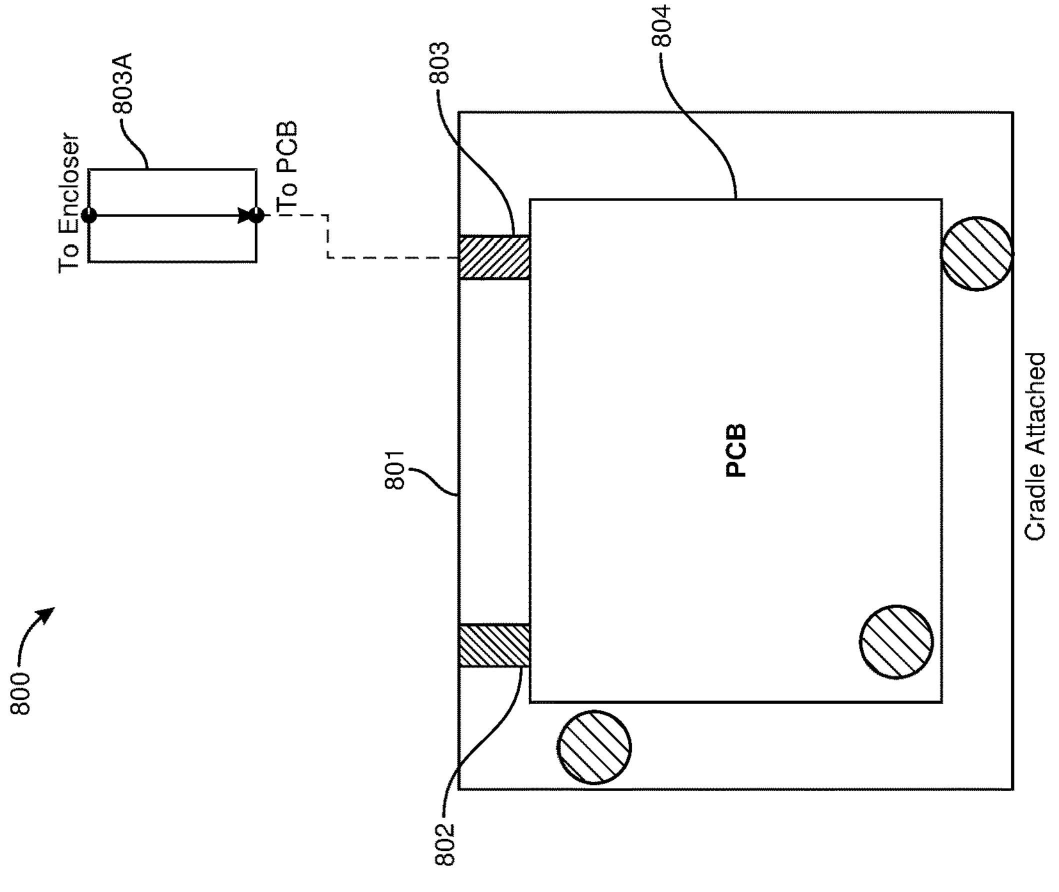

Thus, as shown in FIGS. 8A and 8B, the switchable grounding leg 803 may be switched ON when the cradle is attached to the enclosure (see 803A of FIG. 8A), and may be switched OFF when the cradle is unattached from the enclosure (see 803B of FIG. 8B). In the embodiment 800 shown in FIGS. 8A and 8B, the cradle (not shown) may be made from a conductive material. As such, the cradle may radiate at various frequencies, including frequencies used by different wireless communication bands. When the switchable grounding leg 803 is switched ON, upon determining that the cradle is coupled to the enclosure 801, the PCB 804 may then be grounded to the enclosure 801 via grounding leg 802 and via switchable grounding leg 803. When the switchable grounding leg 803 is switched OFF upon determining that the cradle is uncoupled from the enclosure 801, the PCB 804 may then be grounded to the enclosure via (only) grounding leg 802. The single ground may provide increased signal strength for some or all of the various antenna feeds in the enclosure 801. In this manner, optimal transmission characteristics may be provided to the watchband system regardless of whether the radiating enclosure 801 is coupled to another radiating device, such as a cradle.

Figure 9A:
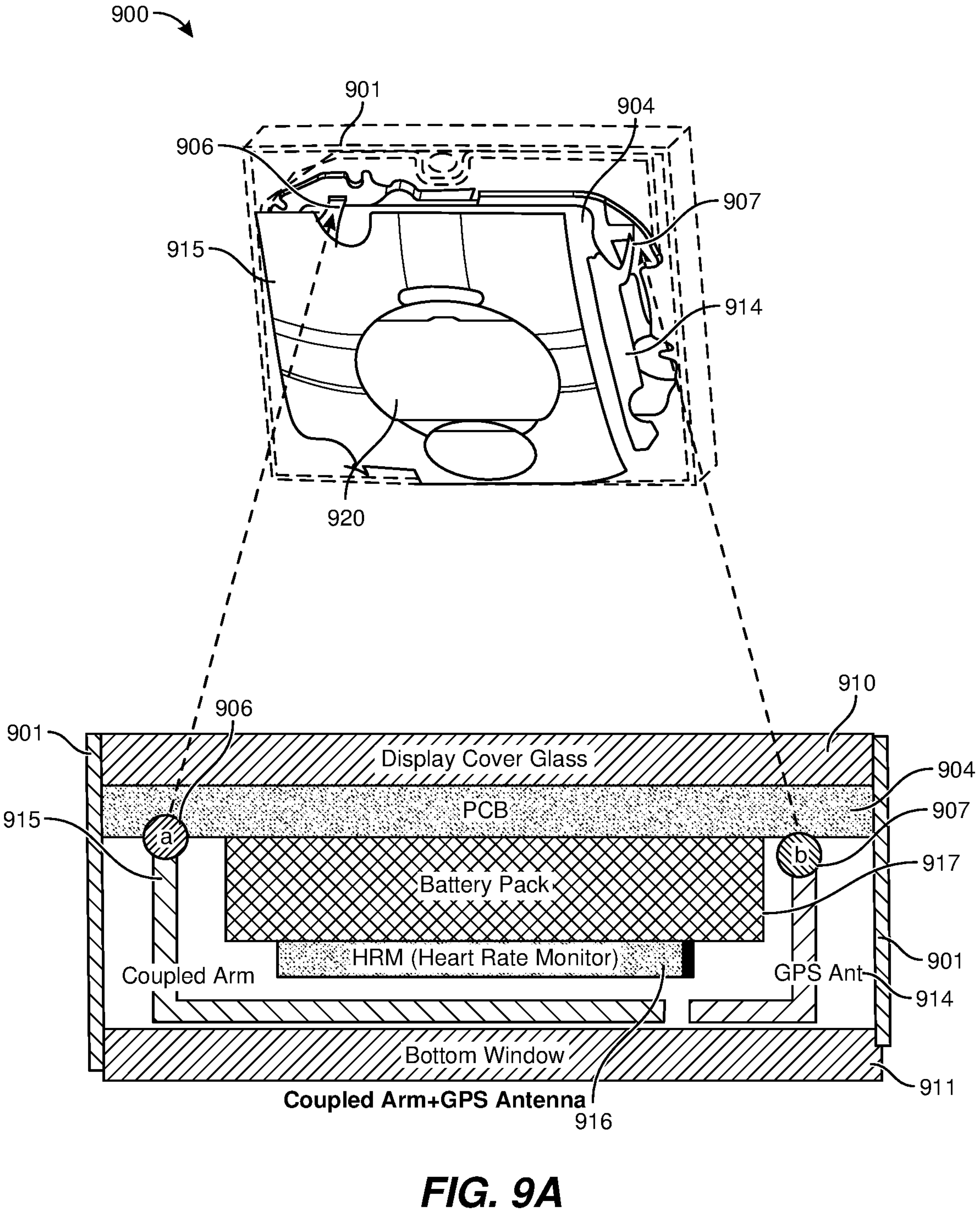
FIG. 9A illustrates a bottom perspective view of an example wristband system.
Figure 9B:
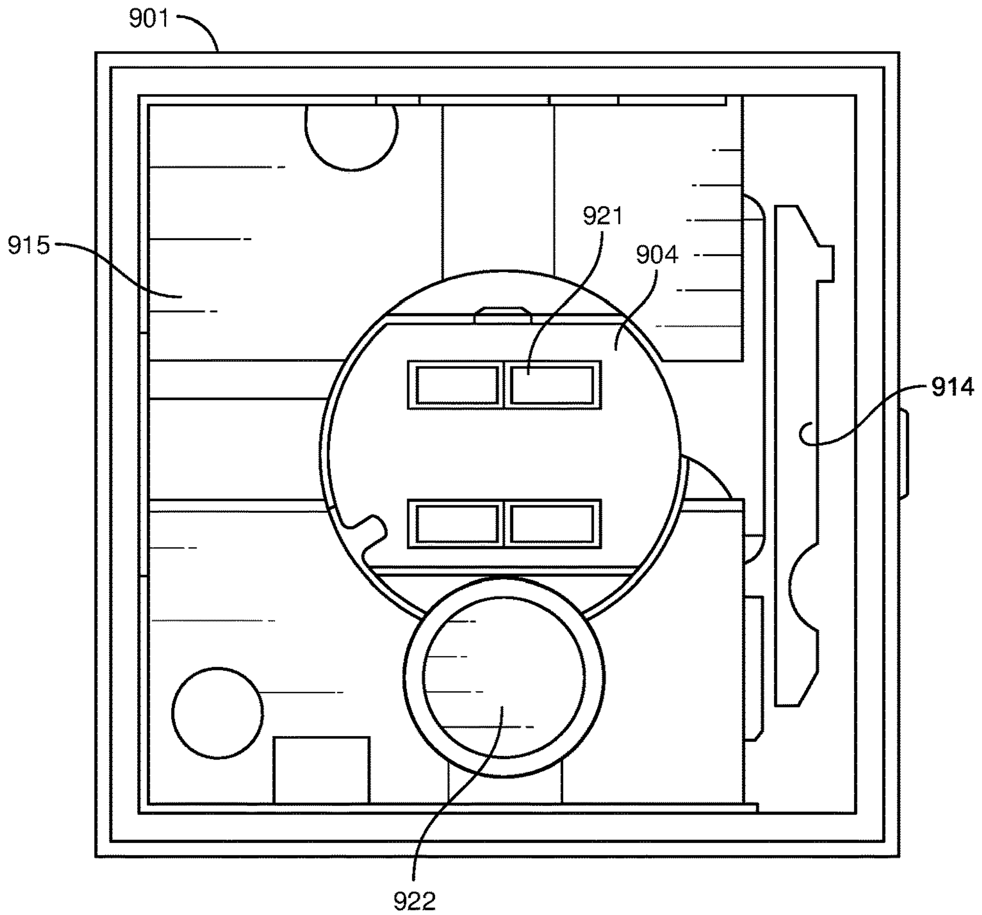
FIG. 9B illustrates a bottom view of an example wristband system.

FIGS. 9A and 9B illustrate alternative embodiments of a wristband system 900. The wristband system 900 may include at least some components that are similar to or the same as those described above. For instance, the wristband system 900 may include an enclosure 901. The enclosure 901 may be configured to house a PCB 904 that, itself, may include various components including a battery pack 917, a heart rate monitor (HRM) 916, and other components including an antenna feed 906 (e.g., an LTE antenna), a coupled radiating arm 915, and an antenna feed 907 and an associated antenna (e.g., GPS antenna 914). The coupled radiating arm 915 may be configured to operate at low- or mid-band LTE frequencies, and may be used in conjunction with another antenna (e.g., a loop antenna) that is configured to operate at high-band LTE frequencies. The antenna feed 907 may be a GPS antenna feed, and may be connected to GPS antenna 914. In some cases, the coupled radiating arm 915 and/or the GPS antenna 914 may extend over a bottom portion of the enclosure (e.g., along bottom window 911). The coupled radiating arm 915 and the GPS antenna may be manufactured in substantially any shape or size, and may be conformed to curvature in the enclosure and may correspond to curvature on the cradle. On its top end, the enclosure 901 may include display cover glass 910 that covers a touch-screen or other type of display.

As shown in the bottom view of FIG. 9B, the enclosure 901 may include holes or cutouts 920 for various sensors. For instance, the enclosure 901 may include a cutout in the radiating arm 915 that accommodates an image sensor such as a camera 922. Additionally or alternatively, the enclosure 901 may include a cutout for other sensors including heart rate sensors 921 or other sensors disposed on the PCB 904. The GPS antenna 914 may also be visible on the bottom view of FIG. 9B. As shown in both FIGS. 9A and 9B, the GPS antenna 914 may be positioned away from the radiating arm 915, which, at least in some embodiments, may cover a substantial portion of the underside of the enclosure 901.

Figure 10:
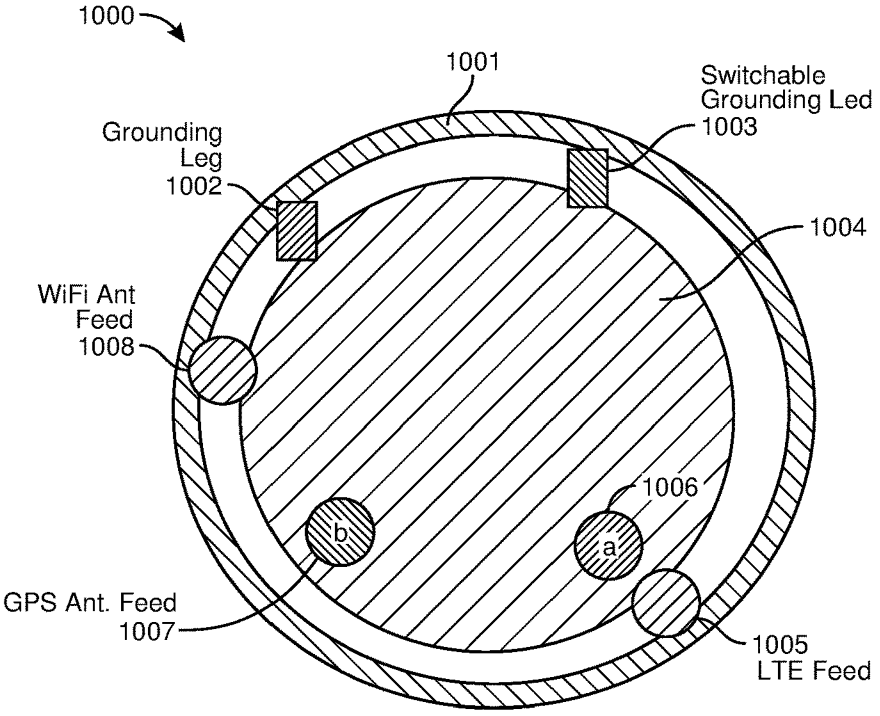
FIG. 10 illustrates a top view of a diagram of an alternative example wristband system.

FIG. 10 illustrates an embodiment of a wristband system 1000 that is manufactured in a different form factor than that shown in FIG. 3A, for example. The round form factor of FIG. 10 may still include different antenna feeds including LTE feed 1005 (which may be connected to a coupled radiating arm 1006 for broader bandwidth coverage), GPS antenna feed 1007, and/or WiFi antenna feed 1008. The wristband system 1000 may also include a first grounding leg 1002 and a second, switchable grounding leg 1003 that separately ground the PCB 1004 to the enclosure 1001. The spacing of the various antenna feeds and the grounding legs 1002 and 1003 may be similar to or the same as the relative spacing described in reference to FIGS. 5A and 5B. Moreover, some or all of the same factors may be implemented when determining how far apart each antenna feed and grounding leg should be from each other. As in the examples above, when a cradle is detected, a controller may send a signal to the switchable grounding leg 1003 to switch the grounding leg ON, resulting in two operational grounding legs that ground the PCB 1004 to the radiating enclosure 1001. Similarly, when the cradle is no longer detected, the controller may send a signal to the switchable grounding leg 1003 to switch the grounding leg OFF, resulting in a single grounding leg 1002 that grounds the PCB 1004 to the radiating enclosure 1001.

Figure 11A:
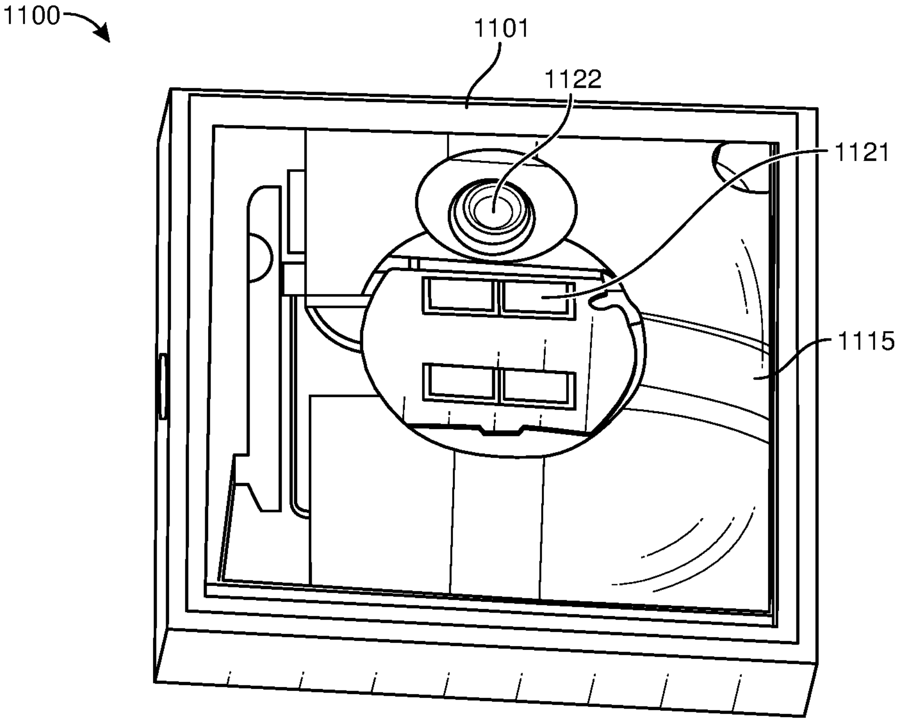
FIGS. 11A-11C illustrate example embodiments of a wristband system in which different radiating components may be implemented.
Figure 11B:
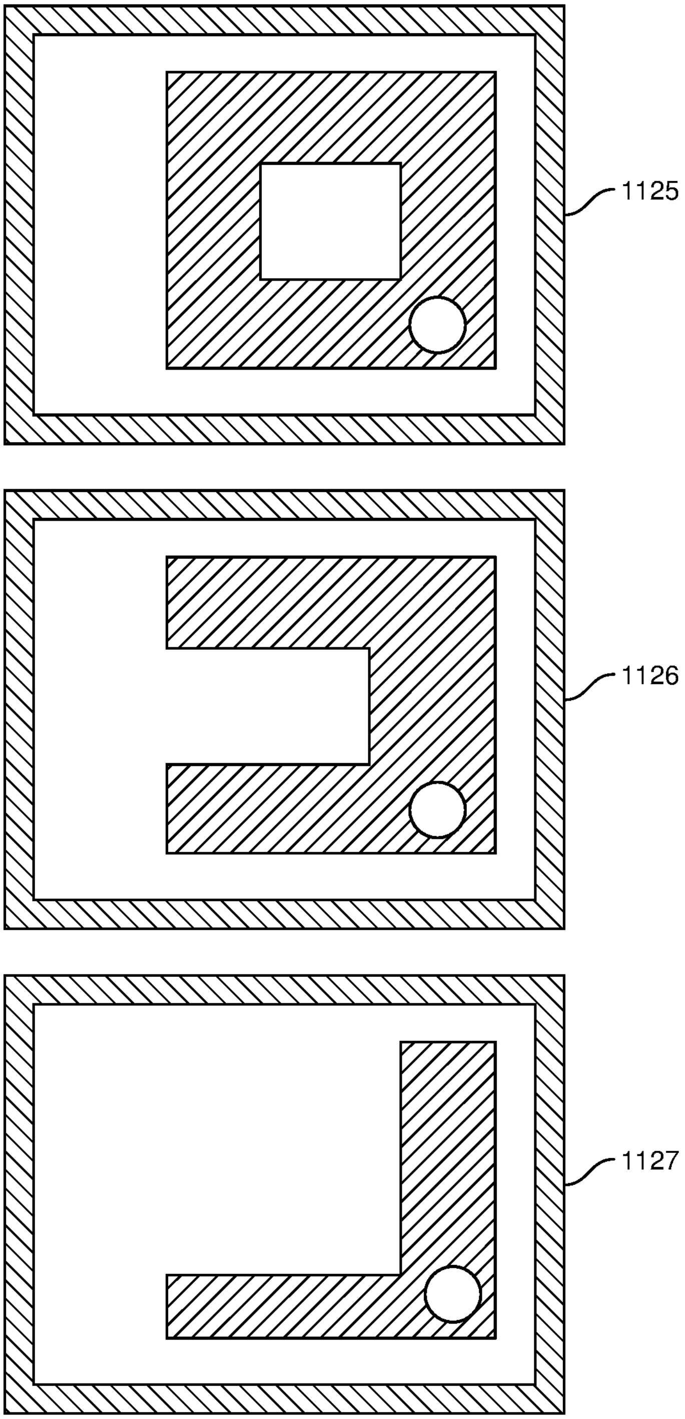
Figure 11C:
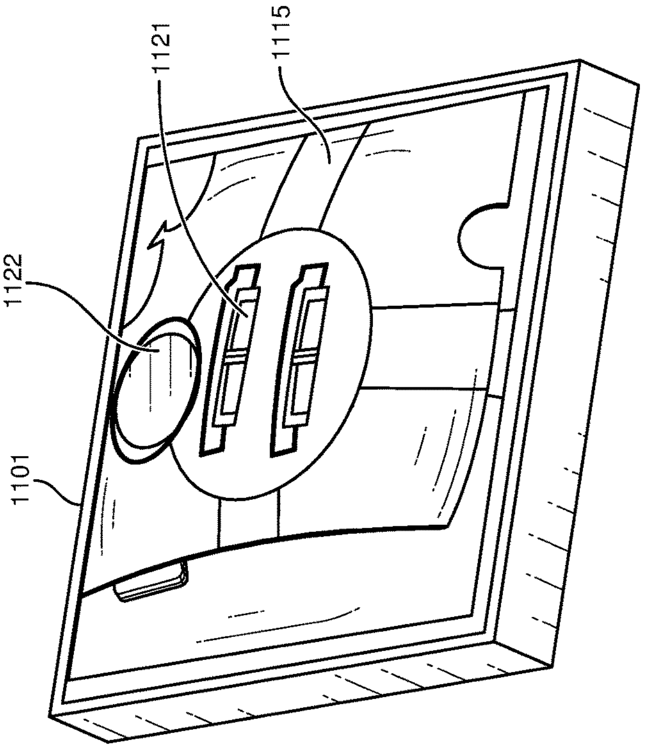
Figure 11C:
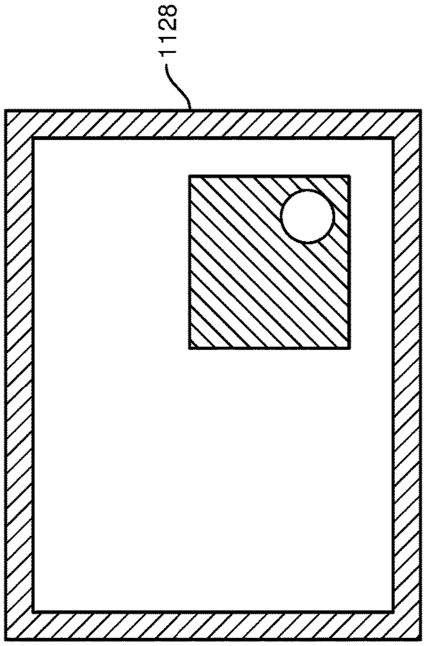
Figure 11C:
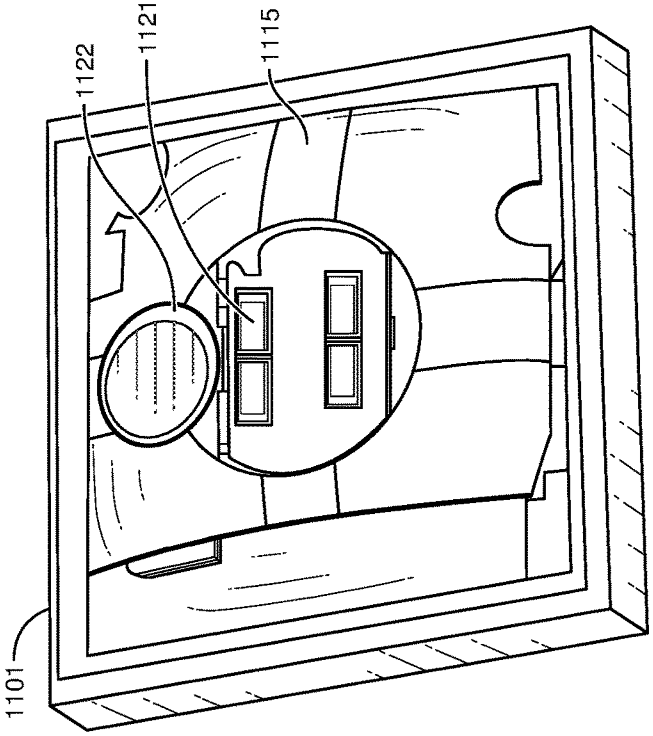

FIGS. 11A-11C illustrate different embodiments of example radiating coupling arms. In some cases, the radiating coupling arm 1115 of wristband system 1100 in FIG. 11A may be substantially C-shaped. In some cases, the radiating coupling arm 1115 may be shaped or designed to wrap around existing electronic components including, for example, a camera 1122, heart rate sensors 1121, or other types of sensors that may be included within the enclosure 1101. The radiating coupling arm 1115 may also be designed to provide space for antennas or other components within the enclosure. FIG. 11B shows various examples of potential radiating coupling arms 1125-1127. The radiating coupling arm 1125 may be a square shape, while radiating coupling arm 1126 may be C-shaped and radiating coupling arm 1127 may be L-shaped. Other shapes are possible and, in some cases, the radiating coupling arm 1115 may be form-fit in custom shapes around specified electrical components. Thus, an antenna feed may be coupled to a radiating coupling arm that may be formed in a plurality of different shapes or sizes and, in some cases, may be formed around various electrical components that are disposed on the bottom portion of the enclosure's PCB. FIG. 11C illustrates an embodiment in which the radiating coupling arm 1115 may be a square-shaped sheet 1128. The square-shaped sheet may be a solid piece of radiating material, or may include holes or cutouts for electronic components including a camera 1122, heart rate sensors 1121, or other components.

In some embodiments, the bottom portion of the enclosure 1101 may be formed using a material that is transparent to radio frequencies. Such an RF transparent material may include glass, plastic, or other similar non-conducting material. In such cases, one or more of the antennas (e.g., GPS, LTE, WiFi, Bluetooth, NFC, etc.) may be at least partially disposed within the RF transparent material of the bottom part of the enclosure 1101. The RF transparent material may allow RF waves to emanate through the bottom of the enclosure 1101 and out to the world at large. In some cases, the entire bottom portion of the enclosure 1101 may be formed using the RF transparent material, while in other cases, only portions of the bottom of the enclosure 1101 may be formed with the RF transparent material.

Figure 12:
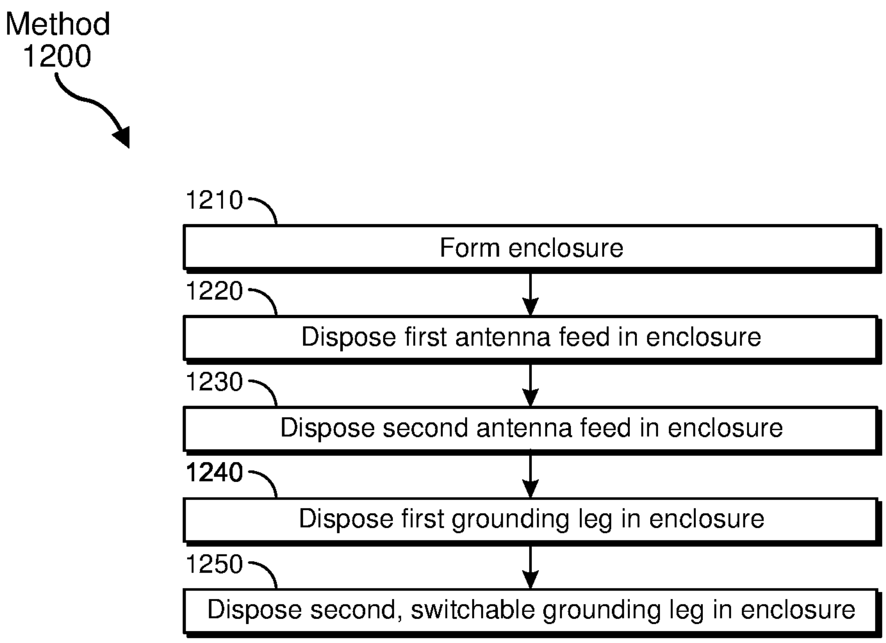
FIG. 12 is a flow diagram of an exemplary method for manufacturing a mobile electronic device.

FIG. 12 is a flow diagram of an exemplary method of manufacturing 1200 for manufacturing a mobile electronic device. The steps shown in FIG. 12 may be performed by any suitable controller, computer-executable code, and/or computing system, including the systems illustrated in the various Figures. In one example, each of the steps shown in FIG. 12 may represent a method of manufacturing that includes and/or is represented by multiple sub-steps, examples of which will be provided in greater detail below.

As illustrated in FIG. 12, one or more of the systems described herein may manufacture a mobile electronic device including, at step 1210, forming an enclosure using a conductive material. The enclosure may be configured to house various internal electrical components disposed on a printed circuit board (PCB) including tuners, controllers, amplifiers, sensors, or other electronic components. The method may next include, at step 1220, disposing, within the enclosure, a first antenna feed that is electrically connected to the PCB and to the enclosure, and is further electrically connected to a radiating coupling arm configured for wireless communication in a first wireless communication band (e.g., LTE). Then, at step 1230, the method may include disposing, within the enclosure, a second antenna feed that is electrically connected to the PCB, and is further electrically connected to an antenna configured for wireless communication in a second, different wireless communication band (e.g., GPS). Still further, at step 1240, the method may include disposing, within the enclosure, a first grounding leg that forms an electrical ground between the PCB and the enclosure, and then, at step 1250, disposing, within the enclosure, a second, switchable grounding leg positioned at least a minimum specified distance away from the first grounding leg. The second, switchable grounding leg may provide a controllable electrical ground between the PCB and the enclosure.

The method of manufacturing 1200 of FIG. 12 may produce a mobile electronic device. That mobile electronic device may include an enclosure made of a conductive material that is designed to radiate electromagnetic waves. The enclosure may be configured to house internal electrical components attached to a printed circuit board (PCB). The enclosure may also be configured to house multiple antenna feeds including a first antenna feed that is electrically connected to the PCB and to the enclosure, and is further electrically connected to a radiating coupling arm configured for wireless communication in a first wireless communication band. The enclosure may also house a second antenna feed that is electrically connected to the PCB, and is further electrically connected to an antenna configured for wireless communication in a second, different wireless communication band. Still further, the mobile electronic device may include a first grounding leg that forms an electrical ground between the PCB and the enclosure, and a second, switchable grounding leg positioned at least a minimum specified distance away from the first grounding leg, where the second, switchable grounding leg provides a controllable electrical ground between the PCB and the enclosure.

In some cases, the method of manufacturing 1200 may include manufacturing a conductive cradle with one or more wrist straps. The conductive cradle may be configured to couple with (and may be structurally conformed with) the enclosure. When coupling with the cradle, a sensor within the enclosure may detect the presence of the cradle and may switch the switchable grounding leg to ON, thereby providing two different grounding legs. Then, when the enclosure is uncoupled from the cradle, the sensor may indicate such, and a controller within the enclosure may send a control signal to the switchable grounding leg to switch OFF, thereby reducing the enclosure to a single grounding leg. This ability to add or remove grounding legs may provide additional bandwidth and signal strength to certain antennas (including GPS antennas) when the enclosure is removed from the cradle.

Example Embodiments

Example 1: A system may include an enclosure comprising a conductive material that is configured to house one or more internal electrical components disposed on a printed circuit board (PCB), a first antenna feed that is electrically connected to the PCB and to the enclosure, and is further electrically connected to a radiating coupling arm configured for wireless communication in at least a first wireless communication band, a second antenna feed that is electrically connected to the PCB, and is further electrically connected to an antenna configured for wireless communication in a second, different wireless communication band, a first grounding leg that forms an electrical ground between the PCB and the enclosure, and a second, switchable grounding leg positioned at least a minimum specified distance away from the first grounding leg, the second, switchable grounding leg providing a controllable electrical ground between the PCB and the enclosure.

Example 2: The system of Example 1, wherein the conductive material of the enclosure comprises a radiator for communication in at least one of the first wireless communication band or the second, different wireless communication band.

Example 3: The system of any of Examples 1 and 2, further comprising a controller configured to send control signals to the second, switchable grounding leg, wherein switching the second, switchable grounding leg alters an effective elliptical radiating length of the enclosure.

Example 4: The system of any of Examples 1-3, further comprising a cradle that is configured to removably couple with the enclosure.

Example 5: The system of any of Examples 1-4, wherein the cradle comprises a conductive material that, when coupled to the enclosure, radiates at the frequency of the second, different wireless communication band.

Example 6: The system of any of Examples 1-5, wherein the second, switchable grounding leg is switched on upon determining that the cradle is coupled to the enclosure, such that the PCB is grounded to the enclosure via the first grounding leg and the second, switchable grounding leg.

Example 7: The system of any of Examples 1-6, wherein the second, switchable grounding leg is switched off upon determining that the cradle is uncoupled from the enclosure, such that the PCB is grounded to the enclosure via the first grounding leg.

Example 8: The system of any of Examples 1-7, further comprising one or more sensors configured to detect when the cradle is coupled to or uncoupled from the enclosure.

Example 9: The system of any of Examples 1-8, wherein the first antenna feed that is electrically connected to the PCB and to the enclosure is electrically connected to the enclosure at a first position, and wherein the first grounding leg is electrically connected to the enclosure at a second position that is at least a specified minimum distance away from the first position.

Example 10: The system of any of Examples 1-9, wherein the second antenna feed that is electrically connected to the PCB is electrically connected to the PCB at a third position that lies between the first position and the second position relative to the enclosure.

Example 11: The system of any of Examples 1-10, wherein a third, different antenna feed is electrically connected to the PCB and to the enclosure at a fourth position that lies between the third position of the second antenna feed and the second position of the first grounding leg.

Example 12: The system of any of Examples 1-11, wherein the specified minimum distance between the first position of the first antenna feed and the second position of the first grounding leg is a relative distance that is variable based upon one or more factors.

Example 13: The system of any of Examples 1-12, wherein at least one of the factors comprises a transmitting or receiving frequency of the first antenna feed.

Example 14: The system of any of Examples 1-13, wherein a bottom portion of the enclosure is formed using a radio frequency (RF) transparent material.

Example 15: The system of any of Examples 1-14, wherein the antenna of the second antenna feed is at least partially disposed within the RF transparent material of the bottom portion of the enclosure.

Example 16: The system of any of Examples 1-15, wherein the radiating coupling arm of the first antenna feed is at least one of ring-shaped, C-shaped, or L-shaped.

Example 17: The system of any of Examples 1-16, wherein the radiating coupling arm is formed around one or more electrical components disposed on a bottom portion of the PCB.

Example 18: The system of any of Examples 1-17, wherein the first antenna feed comprises at least one of a Long-Term Evolution (LTE) feed, a WiFi feed, or a Bluetooth feed, and wherein the second antenna feed comprises a global positioning system (GPS) feed.

Example 19: A mobile electronic device may include: an enclosure comprising a conductive material that is configured to house one or more internal electrical components disposed on a printed circuit board (PCB), a first antenna feed that is electrically connected to the PCB and to the enclosure, and is further electrically connected to a radiating coupling arm configured for wireless communication in at least a first wireless communication band, a second antenna feed that is electrically connected to the PCB, and is further electrically connected to an antenna configured for wireless communication in a second, different wireless communication band, a first grounding leg that forms an electrical ground between the PCB and the enclosure, and a second, switchable grounding leg positioned at least a minimum specified distance away from the first grounding leg, the second, switchable grounding leg providing a controllable electrical ground between the PCB and the enclosure.

Example 20: A method of manufacturing a mobile electronic device may include forming an enclosure comprising a conductive material that is configured to house one or more internal electrical components disposed on a printed circuit board (PCB), disposing, within the enclosure, a first antenna feed that is electrically connected to the PCB and to the enclosure, and is further electrically connected to a radiating coupling arm configured for wireless communication in at least a first wireless communication band, disposing, within the enclosure, a second antenna feed that is electrically connected to the PCB, and is further electrically connected to an antenna configured for wireless communication in a second, different wireless communication band, disposing, within the enclosure, a first grounding leg that forms an electrical ground between the PCB and the enclosure, and disposing, within the enclosure, a second, switchable grounding leg positioned at least a minimum specified distance away from the first grounding leg, the second, switchable grounding leg providing a controllable electrical ground between the PCB and the enclosure.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
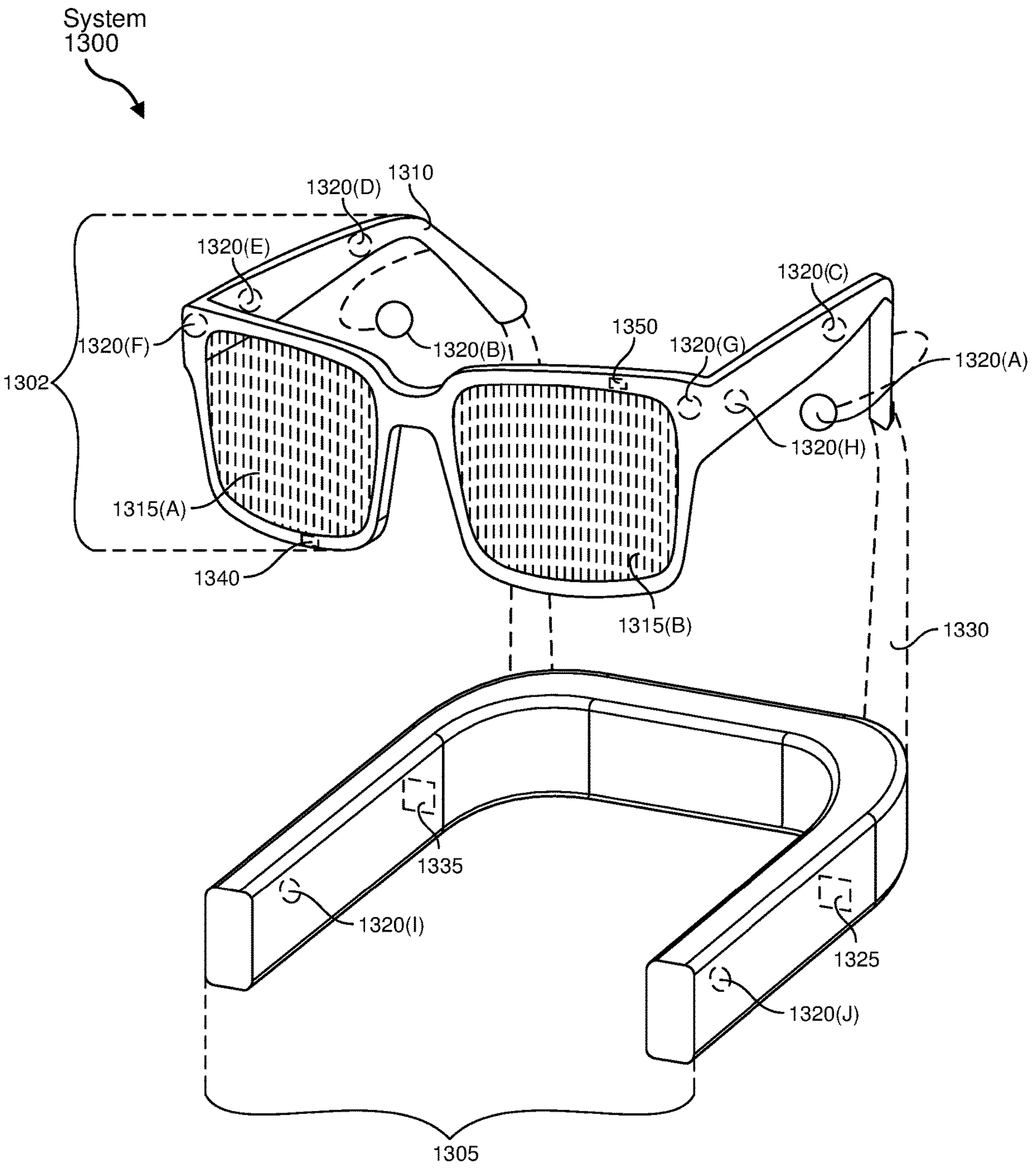
FIG. 13 is an illustration of exemplary augmented-reality glasses that may be used in connection with embodiments of this disclosure.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(I) and 1320(J)) that are part of the microphone array (or potentially form their own microphone subarray). Neckband 1305 may also include a controller 1325 and a power source 1335.

Acoustic transducers 1320(I) and 1320(J) of neckband 1305 may be configured to detect sound and convert the detected sound into an electronic format (analog or digital). In the embodiment of FIG. 13, acoustic transducers 1320(I) and 1320(J) may be positioned on neckband 1305, thereby increasing the distance between the neckband acoustic transducers 1320(I) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
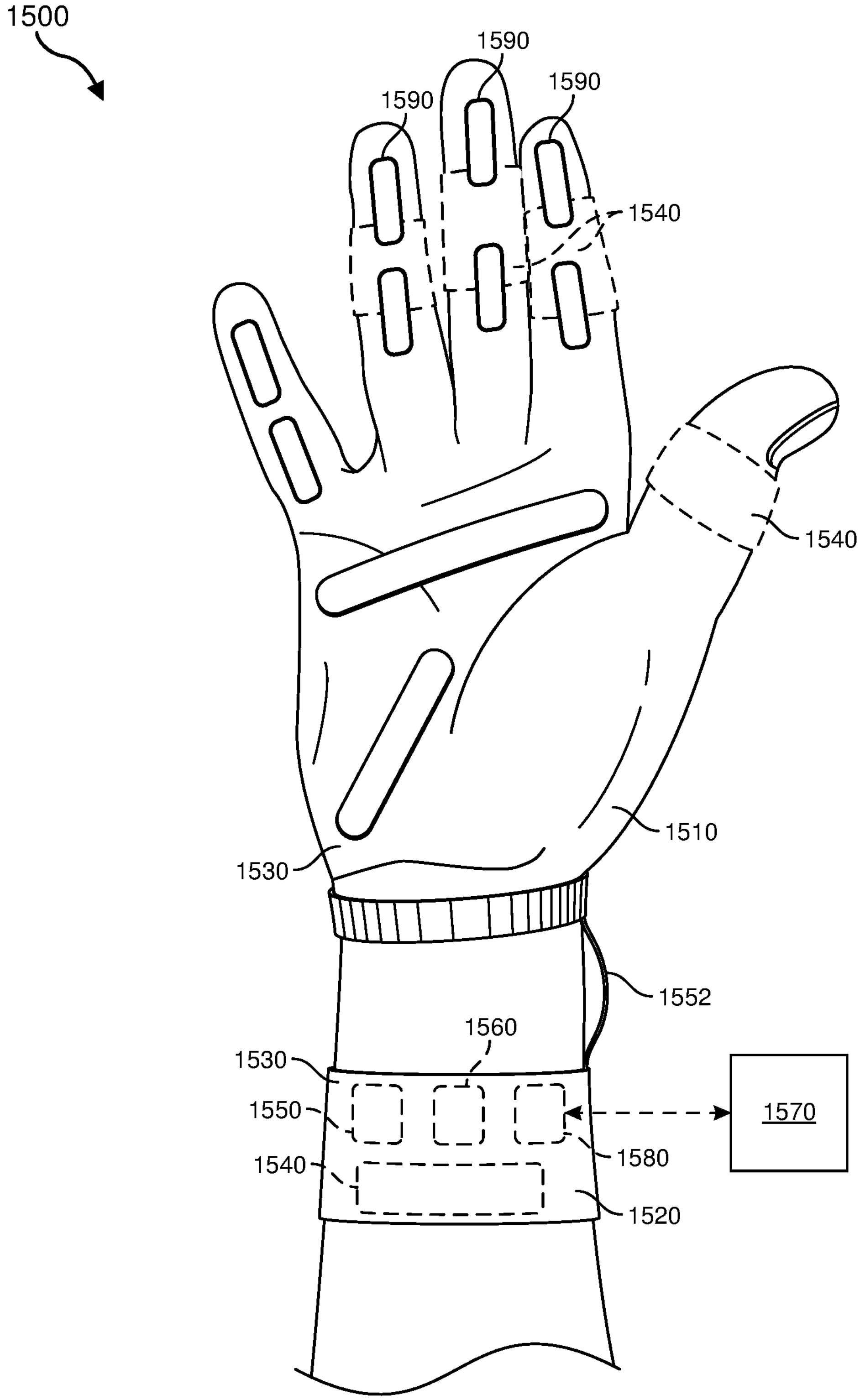
FIG. 15 is an illustration of exemplary haptic devices that may be used in connection with embodiments of this disclosure.

Haptic feedback may be provided by interfaces positioned within a user's environment (e.g., chairs, tables, floors, etc.)

and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). Haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1540 may be positioned at least partially within one or more corresponding pockets formed in textile material 1530 of vibrotactile system 1500. Vibrotactile devices 1540 may be positioned in locations to provide a vibrating sensation (e.g., haptic feedback) to a user of vibrotactile system 1500. For example, vibrotactile devices 1540 may be positioned against the user's finger(s), thumb, or wrist, as shown in FIG. 15. Vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to vibrotactile devices 1540, such as via conductive wiring 1552. In some examples, each of vibrotactile devices 1540 may be independently electrically coupled to power source 1550 for individual activation. In some embodiments, a processor 1560 may be operatively coupled to power source 1550 and configured (e.g., programmed) to control activation of vibrotactile devices 1540.

Vibrotactile system 1500 may be implemented in a variety of ways. In some examples, vibrotactile system 1500 may be a standalone system with integral subsystems and components for operation independent of other devices and systems. As another example, vibrotactile system 1500 may be configured for interaction with another device or system 1570. For example, vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1580 may enable communications between vibrotactile system 1500 and the other device or system 1570 via a wireless (e.g., Wi-Fi, BLUETOOTH, cellular, radio, etc.) link or a wired link. If present, communications interface 1580 may be in communication with processor 1560, such as to provide a signal to processor 1560 to activate or deactivate one or more of the vibrotactile devices 1540.

Vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although power source 1550, processor 1560, and communications interface 1580 are illustrated in FIG. 15 as being positioned in haptic device 1520, the present disclosure is not so limited. For example, one or more of power source 1550, processor 1560, or communications interface 1580 may be positioned within haptic device 1510 or within another wearable textile.

Figure 16:
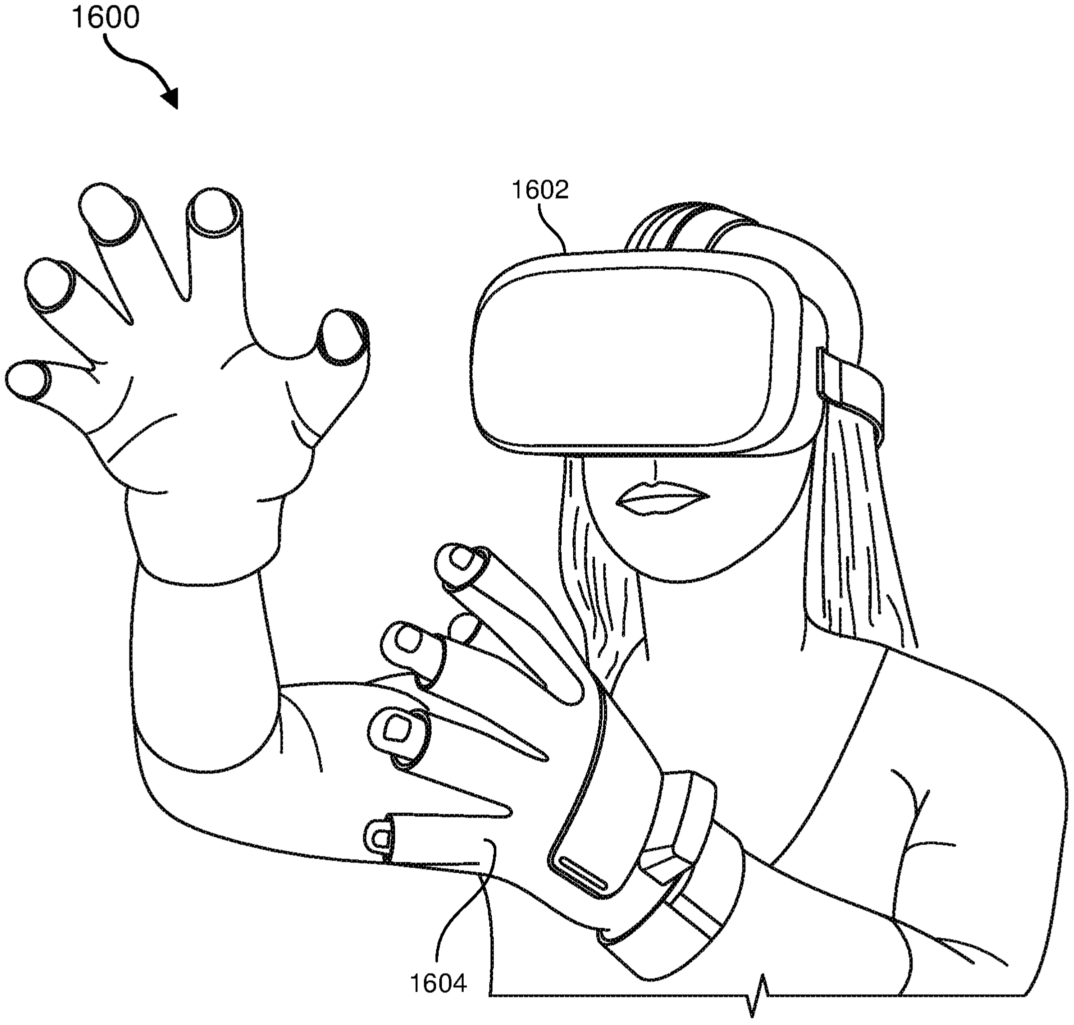
FIG. 16 is an illustration of an exemplary virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
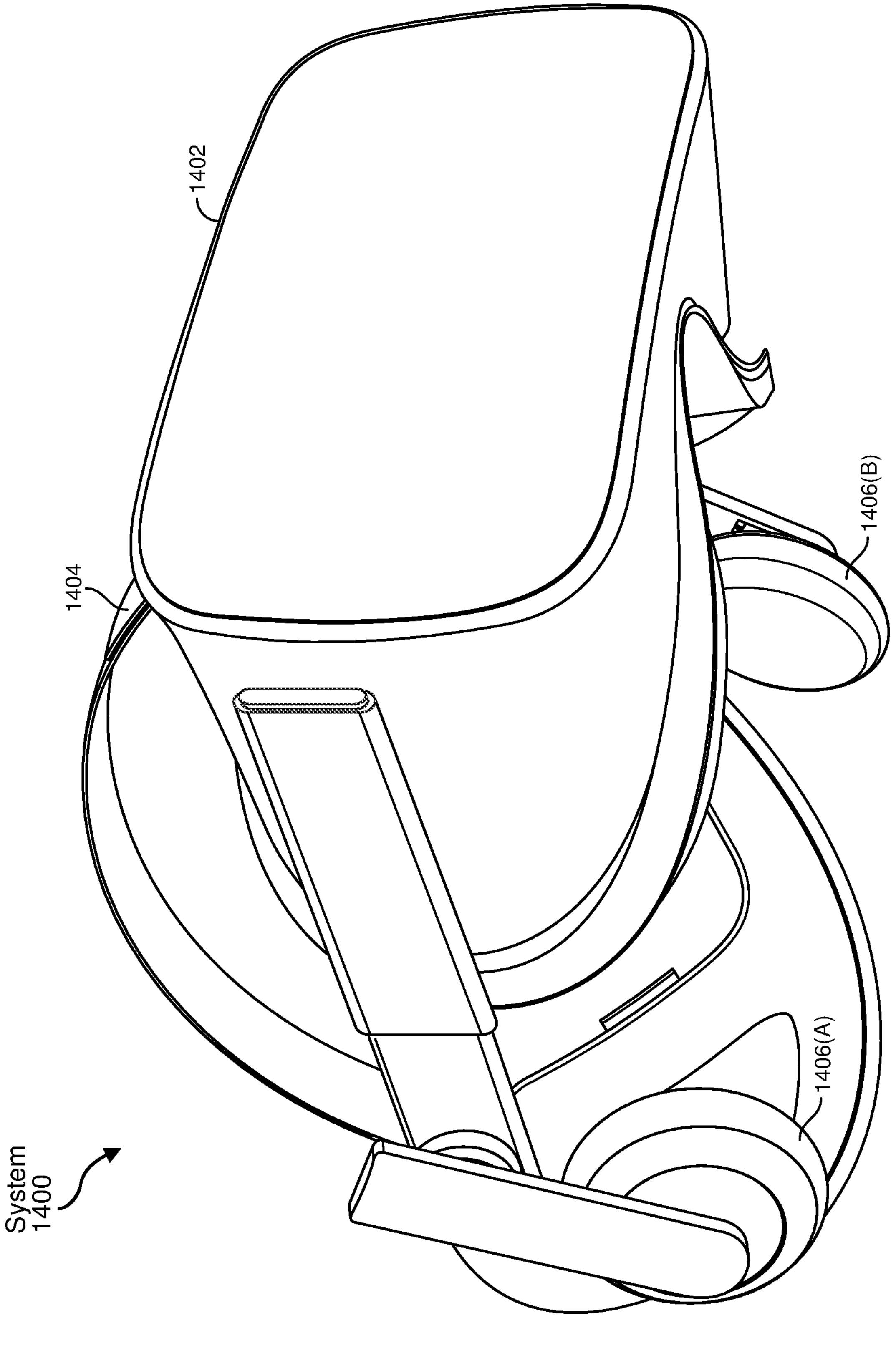
FIG. 14 is an illustration of an exemplary virtual-reality headset that may be used in connection with embodiments of this disclosure.

Head-mounted display 1602 generally represents any type or form of virtual-reality system, such as virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, haptic device 1604 may provide haptic feedback by applying vibration, motion, and/or force to the user. For example, haptic device 1604 may limit or augment a user's movement. To give a specific example, haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1604 to send action requests to a console. Examples of action requests include, without limitation, requests to start an application and/or end the application and/or requests to perform a particular action within the application.

Figure 17:
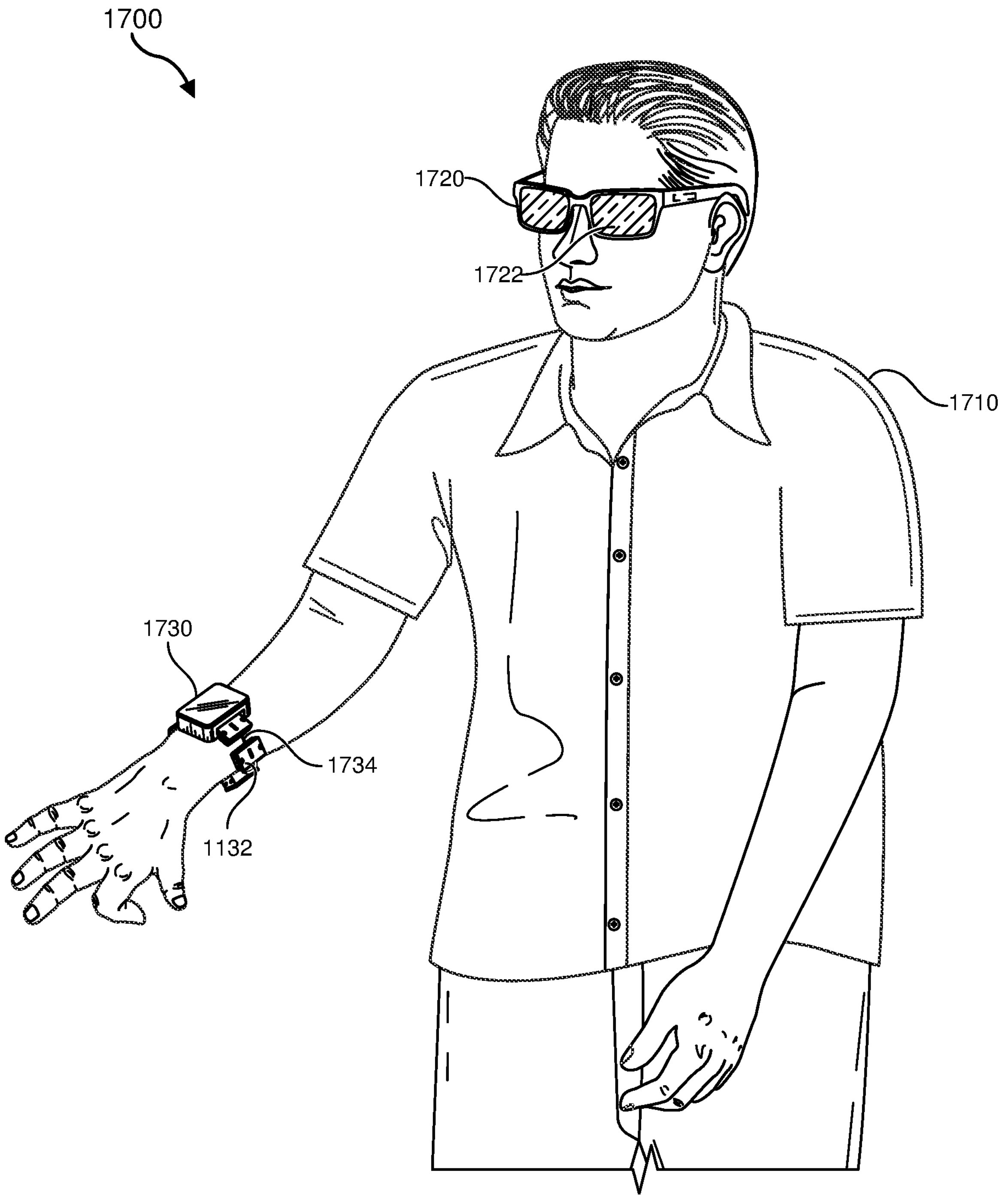
FIG. 17 is an illustration of an exemplary augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, user 1710 may wear a pair of augmented-reality glasses 1720 that may have one or more displays 1722 and that are paired with a haptic device 1730. In this example, haptic device 1730 may be a wristband that includes a plurality of band elements 1732 and a tensioning mechanism 1734 that connects band elements 1732 to one another.

One or more of band elements 1732 may include any type or form of actuator suitable for providing haptic feedback. For example, one or more of band elements 1732 may be configured to provide one or more of various types of cutaneous feedback, including vibration, force, traction, texture, and/or temperature. To provide such feedback, band elements 1732 may include one or more of various types of actuators. In one example, each of band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1510, 1520, 1604, and 1730 may include any suitable number and/or type of haptic transducer, sensor, and/or feedback mechanism. For example, haptic devices 1510, 1520, 1604, and 1730 may include one or more mechanical transducers, piezoelectric transducers, and/or fluidic transducers. Haptic devices 1510, 1520, 1604, and 1730 may also include various combinations of different types and forms of transducers that work together or independently to enhance a user's artificial-reality experience. In one example, each of band elements 1732 of haptic device 1730 may include a vibrotactor (e.g., a vibrotactile actuator) configured to vibrate in unison or independently to provide one or more of various types of haptic sensations to a user.

Figure 18A:
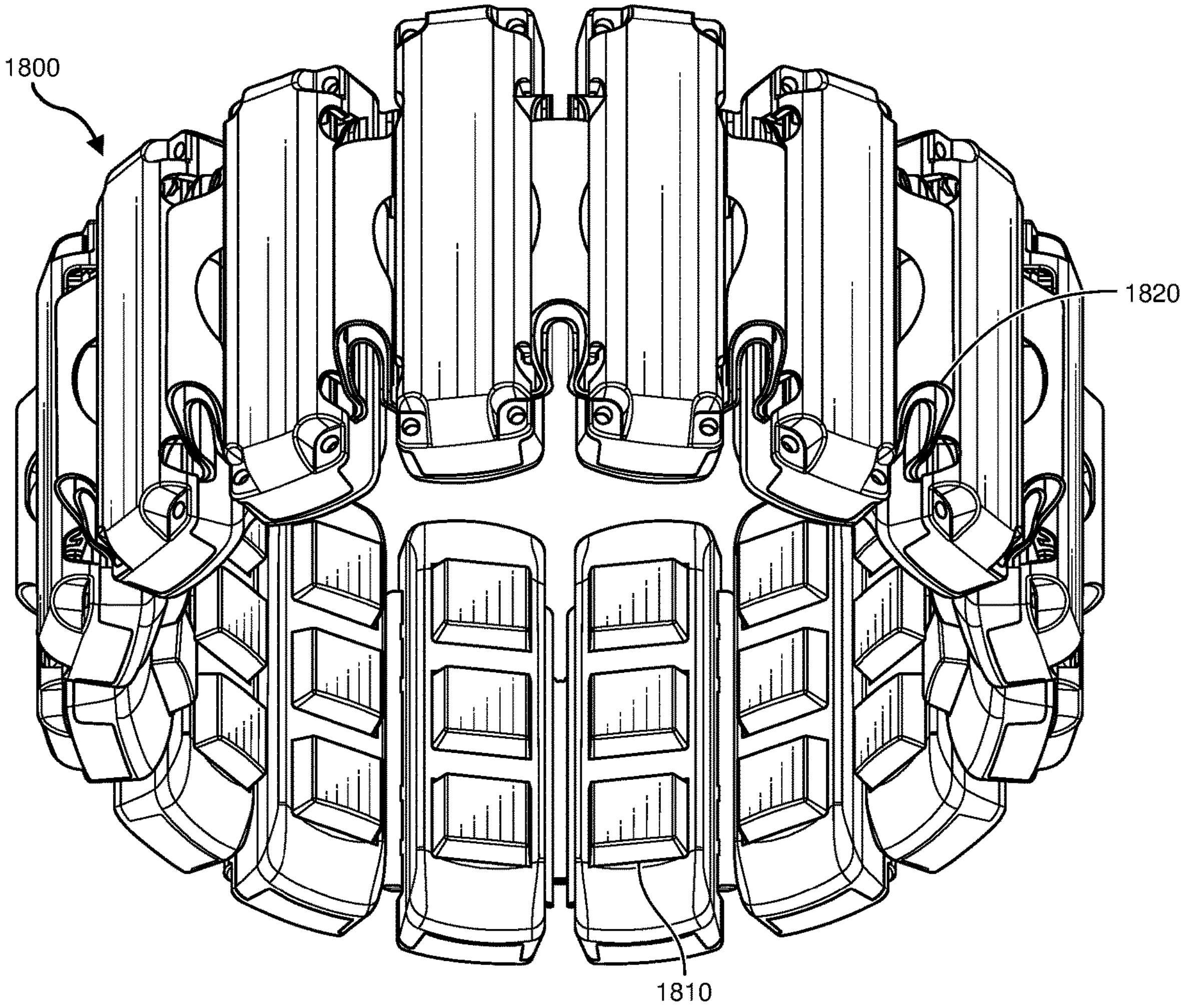
FIGS. 18A and 18B are illustrations of an exemplary human-machine interface configured to be worn around a user's lower arm or wrist.
Figure 18B:
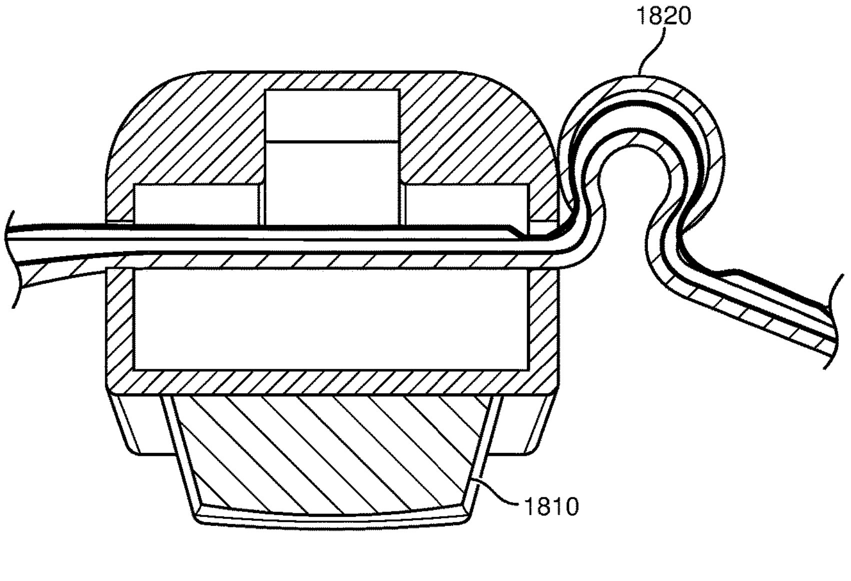

FIG. 18A illustrates an exemplary human-machine interface (also referred to herein as an EMG control interface) configured to be worn around a user's lower arm or wrist as a wearable system 1800. In this example, wearable system 1800 may include sixteen neuromuscular sensors 1810 (e.g., EMG sensors) arranged circumferentially around an elastic band 1820 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 18B illustrates a cross-sectional view through one of the sensors of the wearable device shown in FIG. 18A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1810 is discussed in more detail below with reference to FIGS. 19A and 19B.

Figure 19A:
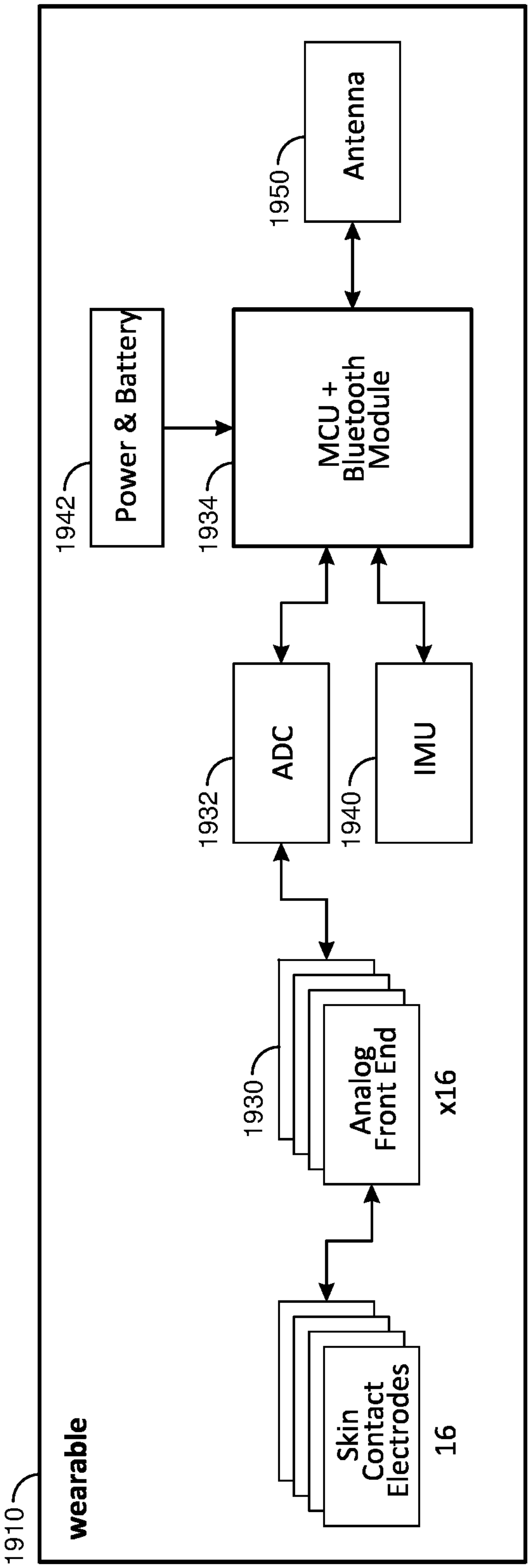
FIGS. 19A and 19B are illustrations of an exemplary schematic diagram with internal components of a wearable system.
Figure 19B:
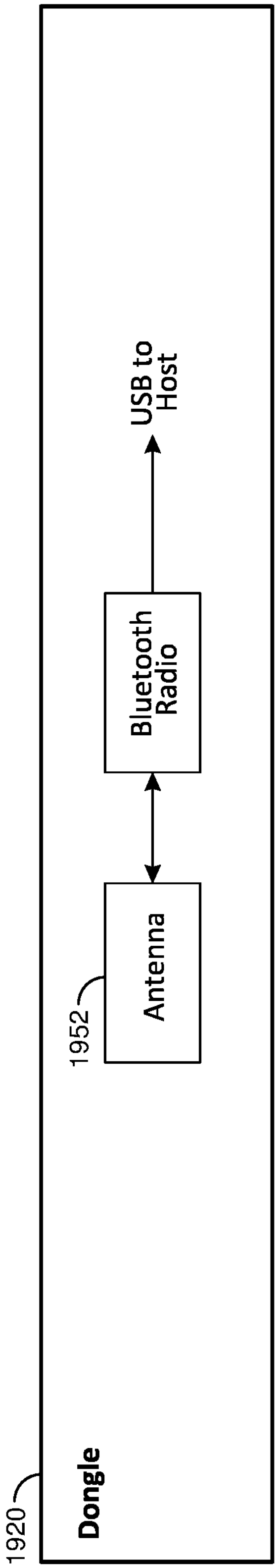

FIGS. 19A and 19B illustrate an exemplary schematic diagram with internal components of a wearable system with EMG sensors. As shown, the wearable system may include a wearable portion 1910 (FIG. 19A) and a dongle portion 1920 (FIG. 19B) in communication with the wearable portion 1910 (e.g., via BLUETOOTH or another suitable wireless communication technology). As shown in FIG. 19A, the wearable portion 1910 may include skin contact electrodes 1911, examples of which are described in connection with FIGS. 18A and 18B. The output of the skin contact electrodes 1911 may be provided to analog front end 1930, which may be configured to perform analog processing (e.g., amplification, noise reduction, filtering, etc.) on the recorded signals. The processed analog signals may then be provided to analog-to-digital converter 1932, which may convert the analog signals to digital signals that can be processed by one or more computer processors. An example of a computer processor that may be used in accordance with some embodiments is microcontroller (MCU) 1934, illustrated in FIG. 19A. As shown, MCU 1934 may also include inputs from other sensors (e.g., IMU sensor 1940), and power and battery module 1942. The output of the processing performed by MCU 1934 may be provided to antenna 1950 for transmission to dongle portion 1920 shown in FIG. 19B.

Dongle portion 1920 may include antenna 1952, which may be configured to communicate with antenna 1950 included as part of wearable portion 1910. Communication between antennas 1950 and 1952 may occur using any suitable wireless technology and protocol, non-limiting examples of which include radiofrequency signaling and BLUETOOTH. As shown, the signals received by antenna 1952 of dongle portion 1920 may be provided to a host computer for further processing, display, and/or for effecting control of a particular physical or virtual object or objects.

Although the examples provided with reference to FIGS. 18A-18B and FIGS. 19A-19B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

an enclosure comprising a conductive material that is configured to house one or more internal electrical components disposed on a printed circuit board (PCB);

a first antenna feed that is electrically connected to the PCB and to the enclosure, and is further electrically connected to a radiating coupling arm configured for wireless communication in at least a first wireless communication band;

a second antenna feed that is electrically connected to the PCB, and is further electrically connected to an antenna configured for wireless communication in a second, different wireless communication band;

a first grounding leg that forms an electrical ground between the PCB and the enclosure; and a second, switchable grounding leg positioned at least a minimum specified distance away from the first grounding leg, the second, switchable grounding leg providing a controllable electrical ground between the PCB and the enclosure, wherein the second, switchable grounding leg is switched on when the enclosure is coupled to a cradle and is switched off when the enclosure is uncoupled from the cradle.

2. The system of claim 1, wherein the conductive material of the enclosure comprises a radiator for communication in at least one of the first wireless communication band or the second, different wireless communication band.

3. The system of claim 2, further comprising a controller configured to send control signals to the second, switchable grounding leg, wherein switching the second, switchable grounding leg alters an effective elliptical radiating length of the enclosure.

4. The system of claim 1, wherein the cradle is configured to removably couple with the enclosure.

5. The system of claim 4, wherein the cradle comprises a conductive material that, when coupled to the enclosure, radiates at a frequency of the second, different wireless communication band.

6. The system of claim 4, wherein the second, switchable grounding leg is switched on upon determining that the cradle is coupled to the enclosure, such that the PCB is grounded to the enclosure via the first grounding leg and the second, switchable grounding leg.

7. The system of claim 4, wherein the second, switchable grounding leg is switched off upon determining that the cradle is uncoupled from the enclosure, such that the PCB is grounded to the enclosure via the first grounding leg.

8. The system of claim 4, further comprising one or more sensors configured to detect when the cradle is coupled to or uncoupled from the enclosure.

9. The system of claim 1, wherein the first antenna feed that is electrically connected to the PCB and to the enclosure is electrically connected to the enclosure at a first position, and wherein the first grounding leg is electrically connected to the enclosure at a second position that is at least a specified minimum distance away from the first position.

10. The system of claim 9, wherein the second antenna feed that is electrically connected to the PCB is electrically connected to the PCB at a third position that lies between the first position and the second position relative to the enclosure.

11. The system of claim 10, wherein a third, different antenna feed is electrically connected to the PCB and to the enclosure at a fourth position that lies between the third position and the second position.

12. The system of claim 9, wherein the specified minimum distance between the first position of the first antenna feed and the second position of the first grounding leg is a relative distance that is variable based upon one or more factors.

13. The system of claim 12, wherein at least one of the factors comprises a transmitting or receiving frequency of the first antenna feed.

14. The system of claim 1, wherein a bottom portion of the enclosure is formed using a radio frequency (RF) transparent material.

15. The system of claim 14, wherein the antenna of the second antenna feed is at least partially disposed within the RF transparent material of a bottom portion of the enclosure.

16. The system of claim 1, wherein the radiating coupling arm of the first antenna feed is at least one of ring-shaped, C-shaped, or L-shaped.

17. The system of claim 1, wherein the radiating coupling arm is formed around one or more electrical components disposed on a bottom portion of the PCB.

18. The system of claim 1, wherein the first antenna feed comprises at least one of a Long-Term Evolution (LTE) feed, a WiFi feed, or a Bluetooth feed, and wherein the second antenna feed comprises a global positioning system (GPS) antenna feed.

19. A mobile electronic device, comprising:

an enclosure comprising a conductive material that is configured to house one or more internal electrical components disposed on a printed circuit board (PCB);

a first antenna feed that is electrically connected to the PCB and to the enclosure, and is further electrically connected to a radiating coupling arm configured for wireless communication in at least a first wireless communication band;

a second antenna feed that is electrically connected to the PCB, and is further electrically connected to an antenna configured for wireless communication in a second, different wireless communication band;

a first grounding leg that forms an electrical ground between the PCB and the enclosure; and a second, switchable grounding leg positioned at least a minimum specified distance away from the first grounding leg, the second, switchable grounding leg providing a controllable electrical ground between the PCB and the enclosure, wherein the second, switchable grounding leg is switched on when the enclosure is coupled to a cradle and is switched off when the enclosure is uncoupled from the cradle.

20. A method of manufacturing a mobile electronic device, comprising:

forming an enclosure comprising a conductive material that is configured to house one or more internal electrical components disposed on a printed circuit board (PCB);

disposing, within the enclosure, a first antenna feed that is electrically connected to the PCB and to the enclosure, and is further electrically connected to a radiating coupling arm configured for wireless communication in at least a first wireless communication band;

disposing, within the enclosure, a second antenna feed that is electrically connected to the PCB, and is further electrically connected to an antenna configured for wireless communication in a second, different wireless communication band;

disposing, within the enclosure, a first grounding leg that forms an electrical ground between the PCB and the enclosure; and disposing, within the enclosure, a second, switchable grounding leg positioned at least a minimum specified distance away from the first grounding leg, the second, switchable grounding leg providing a controllable electrical ground between the PCB and the enclosure, wherein the second, switchable grounding leg is switched on when the enclosure is coupled to a cradle and is switched off when the enclosure is uncoupled from the cradle.

* * * * *